(12) United States Patent
Nishimura et al.

(10) Patent No.: US 9,025,818 B2
(45) Date of Patent: May 5, 2015

(54) VEHICLE TYPE IDENTIFICATION DEVICE

(71) Applicant: Oki Electric Industry Co., Ltd., Tokyo (JP)

(72) Inventors: Tadafumi Nishimura, Tokyo (JP); Takamitsu Watanabe, Tokyo (JP); Takahiro Watanabe, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 87 days.

(21) Appl. No.: 13/679,559

(22) Filed: Nov. 16, 2012

(65) Prior Publication Data

US 2013/0182908 A1  Jul. 18, 2013

(30) Foreign Application Priority Data

Jan. 17, 2012  (JP) ................. 2012-007235

(51) Int. Cl.
*G06K 9/00* (2006.01)
*G06K 9/78* (2006.01)
*G06K 9/52* (2006.01)
*G06T 7/60* (2006.01)

(52) U.S. Cl.
CPC .. *G06K 9/78* (2013.01); *G06K 9/52* (2013.01); *G06K 2209/23* (2013.01); *G06T 7/602* (2013.01); *G06T 2207/30236* (2013.01)

(58) Field of Classification Search
None
See application file for complete search history.

(56) References Cited

U.S. PATENT DOCUMENTS

| | | | |
|---|---|---|---|
| 2007/0258648 A1* | 11/2007 | Perronnin | 382/224 |
| 2008/0095404 A1* | 4/2008 | Abercrombie et al. | 382/104 |
| 2008/0285859 A1* | 11/2008 | Lei et al. | 382/224 |
| 2009/0180693 A1* | 7/2009 | Desai et al. | 382/173 |
| 2009/0290032 A1* | 11/2009 | Zhang et al. | 348/211.9 |

FOREIGN PATENT DOCUMENTS

JP  2002-190023 A  7/2002

* cited by examiner

*Primary Examiner* — Hadi Akhavannik
(74) *Attorney, Agent, or Firm* — Rabin & Berdo, P.C.

(57) ABSTRACT

There is provided a vehicle type identification device including a detection section detecting, based on a vehicle region extracted from a captured image, on an imaging plane, a ground point, a first endpoint, a minimum ground clearance point, a second endpoint, and an upper endpoint of a vehicle, a vehicle width estimation section estimating a vehicle width in a real space based on the ground point, the first endpoint, and the minimum ground clearance point, a vehicle length estimation section estimating a vehicle length in the real space based on the ground point, the first endpoint, and the second endpoint, a vehicle height estimation section estimating a vehicle height in the real space based on the ground point, the first endpoint, and the upper endpoint, and a vehicle type identification section identifying a type of the vehicle based on the vehicle width, the vehicle length, and the vehicle height.

12 Claims, 16 Drawing Sheets

FIG. 3
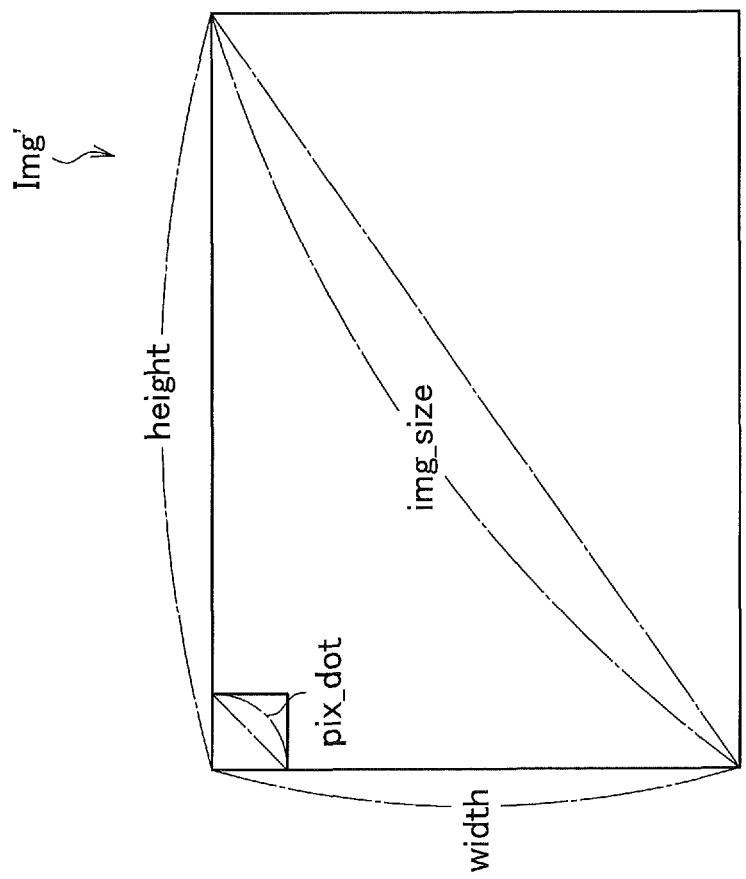
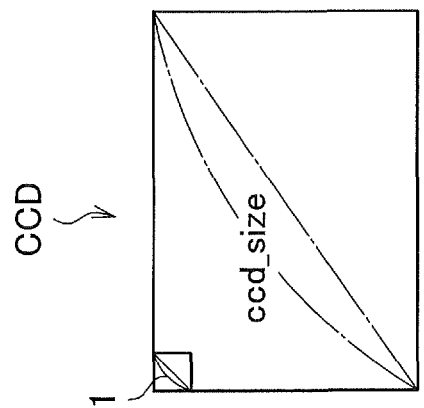

VEHICLE TYPE IDENTIFICATION DEVICE

CROSS REFERENCE TO RELATED APPLICATION(S)

This application is based upon and claims benefit of priority from Japanese Patent Application No. 2012-007235, filed on Jan. 17, 2012, the entire contents of which are incorporated herein by reference.

BACKGROUND

The present invention relates to vehicle type identification device.

In recent years, technology has been disclosed for identifying a type of a vehicle (hereinafter also referred to as "vehicle type") shown in a captured image. The type of the vehicle represents information indicating a result obtained by performing classification based on the size of the vehicle, for example, whether the vehicle is a large size vehicle or a small size vehicle, and represents information indicating the type of the vehicle, for example, whether the vehicle is a bus, a car, or a truck. Such technology includes technology for identifying a type of a vehicle shown in a captured image taken by a monocular camera, for example.

As the technology for identifying a type of a vehicle shown in a captured image taken by a monocular camera, there is disclosed technology using a result obtained by matching with a vehicle model (for example, see JP 2002-190023A), for example. In this technology, a vehicle region is extracted from a captured image, a vehicle model which is stored in advance is converted into an image obtained in the case where the image is taken in an imaging direction, and a vehicle type is identified based on a degree of overlap between the converted image and the vehicle region. As the vehicle model, there is prepared a three-dimensional shape model for each vehicle type.

In the case of using such technology, since a vehicle model which is stored in advance can be converted based on an imaging direction of a camera that is actually installed, restrictions on conditions for camera installation can be reduced.

SUMMARY

However, in the case of using such technology, it is difficult to take into account an actual size of a vehicle. For example, in the case where the vehicle type is identified based on a size of a vehicle region, it is difficult to accurately identify the vehicle type, since a size of a vehicle region of a truck without a load and a size of a vehicle region of a small size vehicle such as a station wagon are similar depending on the way of viewing them.

In light of the foregoing, it is desirable to provide technology capable of enhancing accuracy of vehicle type identification.

According to an embodiment of the present invention, there is provided a vehicle type identification device which includes a detection section which detects, based on a vehicle region extracted from a captured image, on an imaging plane, a ground point of a vehicle, a first endpoint that is a left or right endpoint of the vehicle region, a minimum ground clearance point of the vehicle, a second endpoint that is the left or right endpoint of the vehicle region and is the endpoint at an opposite side of the first endpoint, and an upper endpoint that is a point on a top surface of the vehicle, a vehicle width estimation section which estimates a vehicle width indicating a width of the vehicle in a real space based on the ground point, the first endpoint, and the minimum ground clearance point which have been detected by the detection section, a vehicle length estimation section which estimates a vehicle length indicating a length of the vehicle in the real space based on the ground point, the first endpoint, and the second endpoint which have been detected by the detection section, a vehicle height estimation section which estimates a vehicle height indicating a height of the vehicle in the real space based on the ground point, the first endpoint, and the upper endpoint which have been detected by the detection section, and a vehicle type identification section which identifies a type of the vehicle based on the vehicle width, the vehicle length, and the vehicle height.

The vehicle width estimation section may calculate, as a minimum ground clearance point in the real space, a point of intersection of a line which passes through the minimum ground clearance point and an origin with a vehicle body lower plane obtained by translating a road plane by a minimum ground clearance height in a direction perpendicular to the road plane, and may estimate a vehicle width based on the minimum ground clearance point in the real space, the ground point, and the first endpoint.

The vehicle width estimation section may calculate, as a ground point in the real space, a point of intersection of a line which passes through the ground point and the origin with a road plane on which the vehicle is present, and may estimate a vehicle width based on a line which passes through the ground point in the real space and has a travelling direction vector of the vehicle as a direction, the minimum ground clearance point in the real space, and the first endpoint.

According to another embodiment of the present invention, there is provided a vehicle type identification device which includes a detection section which detects, based on a vehicle region extracted from a captured image, on an imaging plane, a ground point of a vehicle, a first endpoint that is a left or right endpoint of the vehicle region, a second endpoint that is the left or right endpoint of the vehicle region and is the endpoint at an opposite side of the first endpoint, and an upper endpoint that is a point on a top surface of the vehicle, a vehicle width acquisition section which acquires a vehicle width indicating a width of the vehicle in a real space, a vehicle length estimation section which estimates a vehicle length indicating a length of the vehicle in the real space based on the ground point, the first endpoint, and the second endpoint which have been detected by the detection section, a vehicle height estimation section which estimates a vehicle height indicating a height of the vehicle in the real space based on the ground point, the first endpoint, and the upper endpoint which have been detected by the detection section, and a vehicle type identification section which identifies a type of the vehicle based on the vehicle width, the vehicle length, and the vehicle height.

According to another embodiment of the present invention, there is provided a vehicle type identification device which includes an extraction section which extracts a vehicle region from a captured image, a model fitting section which selects a model by checking the vehicle region extracted by the extraction section against a plurality of models that are registered in advance, a size estimation section which estimates a vehicle width indicating a width of the vehicle, a vehicle length indicating a length of the vehicle, and a vehicle height indicating a height of the vehicle based on the model selected by the model fitting section, and a vehicle type identification section which identifies a type of the vehicle based on the vehicle width, the vehicle length, and the vehicle height.

In a state where directions of the plurality of models are adjusted to a direction of the vehicle, the model fitting section may check each of vehicle regions, which are obtained from images of the plurality of models taken in the same imaging direction as the captured image, against the vehicle region extracted by the extraction section.

The model fitting section may adjust the directions of the plurality of models to the direction of the vehicle by rotating the plurality of models in accordance with a travelling direction vector of the vehicle.

According to the embodiments of the present invention described above, the accuracy of the vehicle type identification can be enhanced.

BRIEF DESCRIPTION OF THE DRAWINGS

FIG. 3 is a diagram showing a parameter used by a calibration section;

DETAILED DESCRIPTION OF THE EMBODIMENT(S)

Figure 1:
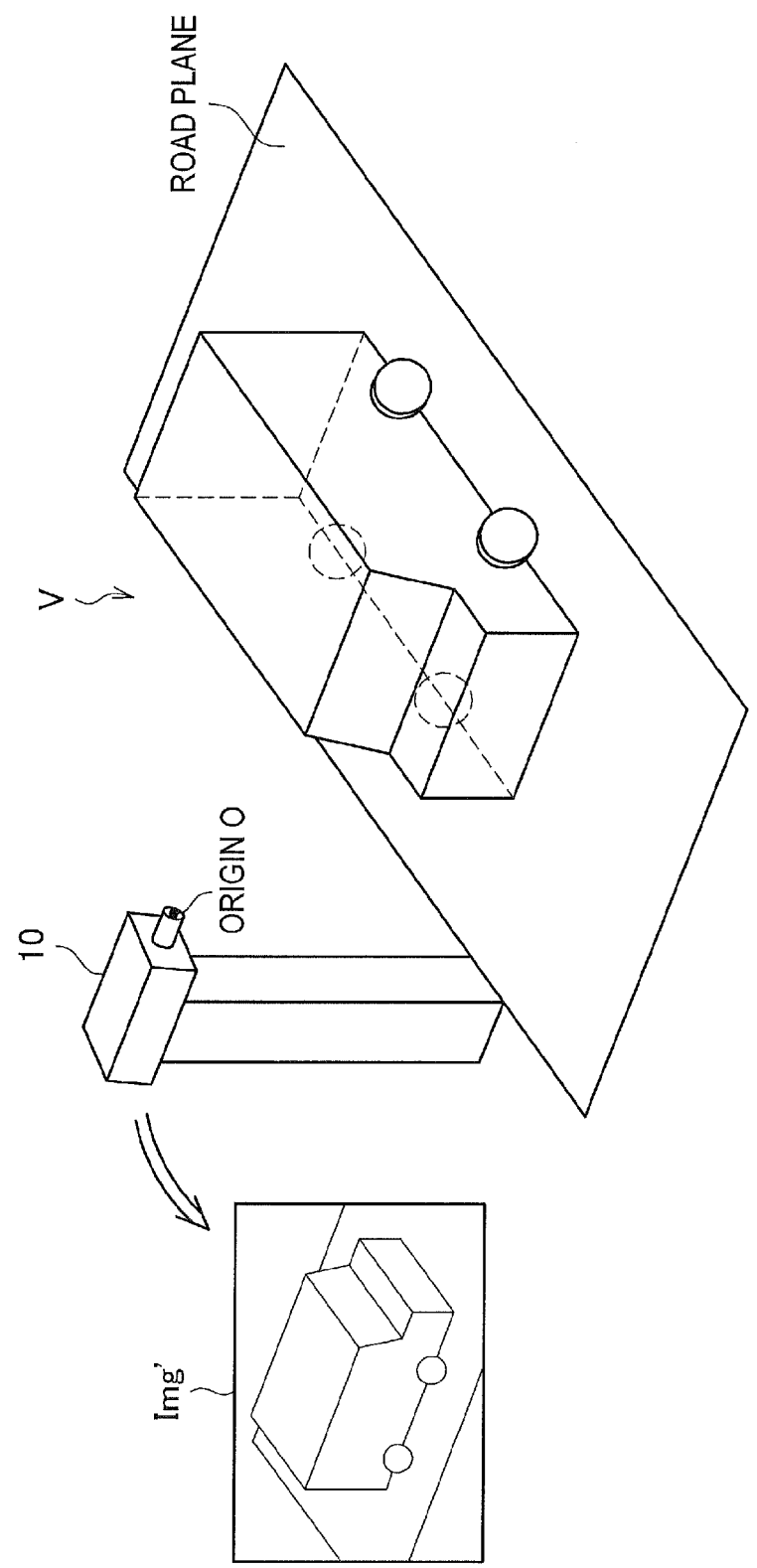
FIG. 1 is a diagram illustrating an overview of a vehicle type identification device.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Further, in this specification and the appended drawings, there are some cases where multiple structural elements that have substantially the same function and structure are distinguished from one another by being denoted with different alphabets after the same reference numeral. Note that, in the case where it is not necessary to distinguish the multiple structural elements that have substantially the same function and structure from one another, the multiple structural elements are denoted with the same reference numeral only.

[Overview of Vehicle Type Identification Device]

FIG. 1 is a diagram illustrating an overview of a vehicle type identification device. With reference to FIG. 1, the overview of the vehicle type identification device will be described. The overview of the vehicle type identification device will be the basis of first to third embodiments described below.

As shown in FIG. 1, a vehicle type identification device 10, a road plane, and a vehicle V are present in real space. Further, the vehicle type identification device 10 having an imaging section embedded therein is installed in a state in which an imaging direction is directed toward the road plane. Since the vehicle V is present on the road plane, the vehicle is shown in a captured image Img' taken by the vehicle type identification device 10. Further, as shown in FIG. 1, the center of a lens of the vehicle type identification device 10 is set as an origin O.

FIG. 1 shows an example in which the imaging direction is directed in a manner that obliquely upper right of the vehicle V is imaged, but the direction of the vehicle V is not particularly limited.

Further, although FIG. 1 shows an example in which the imaging section having an imaging function is embedded in the vehicle type identification device 10, the imaging section may not be embedded in the vehicle type identification device 10 and may be installed outside the vehicle type identification device 10. In this case, for example, the vehicle type identification device 10 may receive the captured image Img' transmitted from the imaging section, and may thus acquire the captured image Img'. Further, for example, the vehicle type identification device 10 may read the captured image Img' recorded in a recording medium by the imaging section, and may thus acquire the captured image Img'.

As will be described below, in first to third embodiments of the present invention, a type of a vehicle V is identified by the vehicle type identification device 10 based on the captured image Img'. According to those embodiments, the vehicle type is identified by taking into account the size of the vehicle V, and therefore, accuracy of the vehicle type identification can be enhanced. First, the first embodiment of the present invention will be described.

Description of First Embodiment

Figure 2:
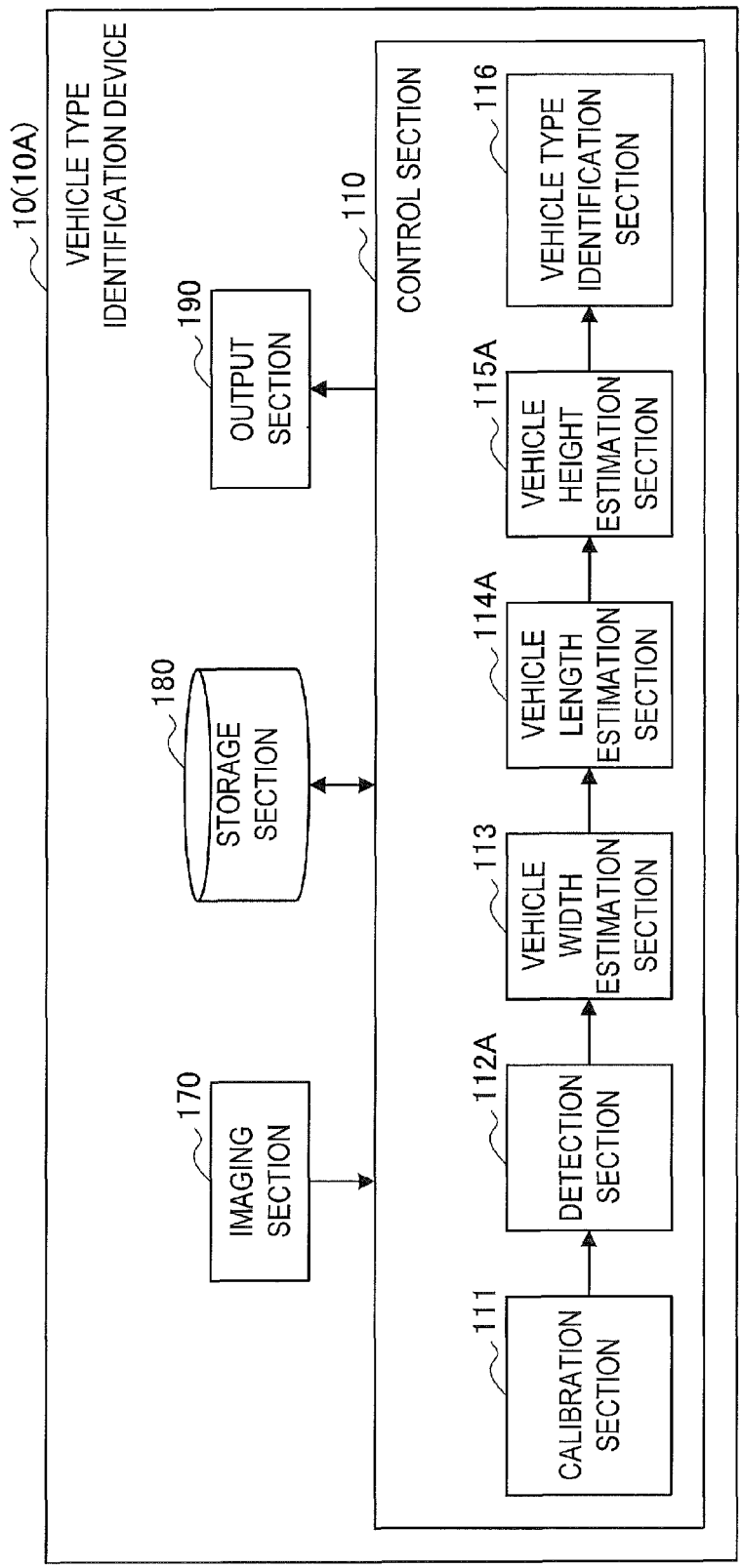
FIG. 2 is a block diagram showing a functional configuration of a vehicle type identification device according to a first embodiment.

First, a first embodiment of the present invention will be described. FIG. 2 is a block diagram showing a functional configuration of a vehicle type identification device 10A according to the first embodiment. As shown in FIG. 2, the vehicle type identification device 10A according to the first embodiment includes a control section 110, an imaging section 170, a storage section 180, and an output section 190.

The imaging section 170 acquires a captured image by imaging a real space. The imaging section 170 can provide the control section 110 with the captured image. The storage section 180 can store a program for causing the control section 110 to operate and data. Further, the storage section 180 can also temporarily store various types of data necessary for processes of operation of the control section 110. The output section 190 can output a vehicle type identified by the control section 110 as an identification result. The output section 190 may be a communication device which transmits the vehicle type to another device, and may be a display device which displays the vehicle type.

The imaging section 170, the storage section 180, and the output section 190 may be installed outside the vehicle type identification device 10A. The control section 110 includes a calibration section 111, a detection section 112A, a vehicle width estimation section 113, a vehicle length estimation section 114A, a vehicle height estimation section 115A, and a vehicle type identification section 116. Hereinafter, details of the respective functional sections included in the control section 110 will be described.

First, it is necessary that calibration be performed before the vehicle type identification device 10A identifies a type of a vehicle V. In more detail, it is necessary that the following be performed as the calibration: processing of calculating a plane equation (hereinafter, also referred to as "road plane equation") of the road on which the vehicle V is present; and processing of calculating a travelling direction of the vehicle V. Hereinafter, with reference to FIG. 3 and FIG. 4, there will be described the calibration performed by the calibration section 111.

FIG. 3 is a diagram showing a parameter used by the calibration section 111. First, it is necessary that the calibration section 111 calculate, based on a size of an image sensor which forms the imaging section 170 and a size of a captured image Img' to be provided to the control section 110, a size pix_dot of the captured image Img' per unit pixel of the image sensor as a parameter. The captured image Img' is generated based on a captured image Img which is imaged on an imaging plane of the image sensor at a focal distance away from the origin O.

As shown in FIG. 3, although an example is described in which the image sensor is a charge coupled device (CCD), the CCD is merely an example of the image sensor. Accordingly, the image sensor may also be a complementary metal oxide semiconductor (CMOS) or the like.

Here, where a CCD size is represented by ccd_size and the size of the captured image Img' is represented by img_size, the calibration section 111 can calculate pix_dot using the following Equation 1. In general, the CCD size is represented by the length of a diagonal line of the CCD, and hence, as shown in Equation 1, pix_dot can be calculated by dividing the CCD size by the root-sum-square of the width and height of the captured image Img'. However, since the calculation of the parameter pix_dot using such a technique is merely an example, the parameter pix_dot may be calculated using another technique. For example, the width or the height of the CCD may be used instead of the diagonal line of the CCD.

$$\text{pix\_dot} = \frac{\text{ccd\_size}}{\sqrt{\text{width} * \text{width} + \text{height} * \text{height}}} \quad \text{(Equation 1)}$$

Note that the CCD size is acquired easily from the imaging section 170, for example. Further, the size of the captured image Img' is acquired from the storage section 180, for example. Accordingly, based on those sizes, the control section 110 can grasp the correspondence relationship between three-dimensional coordinates in the real space of the captured image Img imaged on the imaging plane of the CCD and two-dimensional coordinates of the captured image Img' to be provided to the control section 110. That is, the control section 110 can grasp, based on the correspondence relationship, the three-dimensional coordinates in the real space of the captured image Img imaged on the imaging plane of the CCD from the two-dimensional coordinates of the captured image Img' to be provided to the control section 110.

The calibration is performed using the thus calculated parameter. Hereinafter, with reference to FIG. 4, there will be described the calibration performed by the calibration section 111 by using the parameter.

Figure 4:
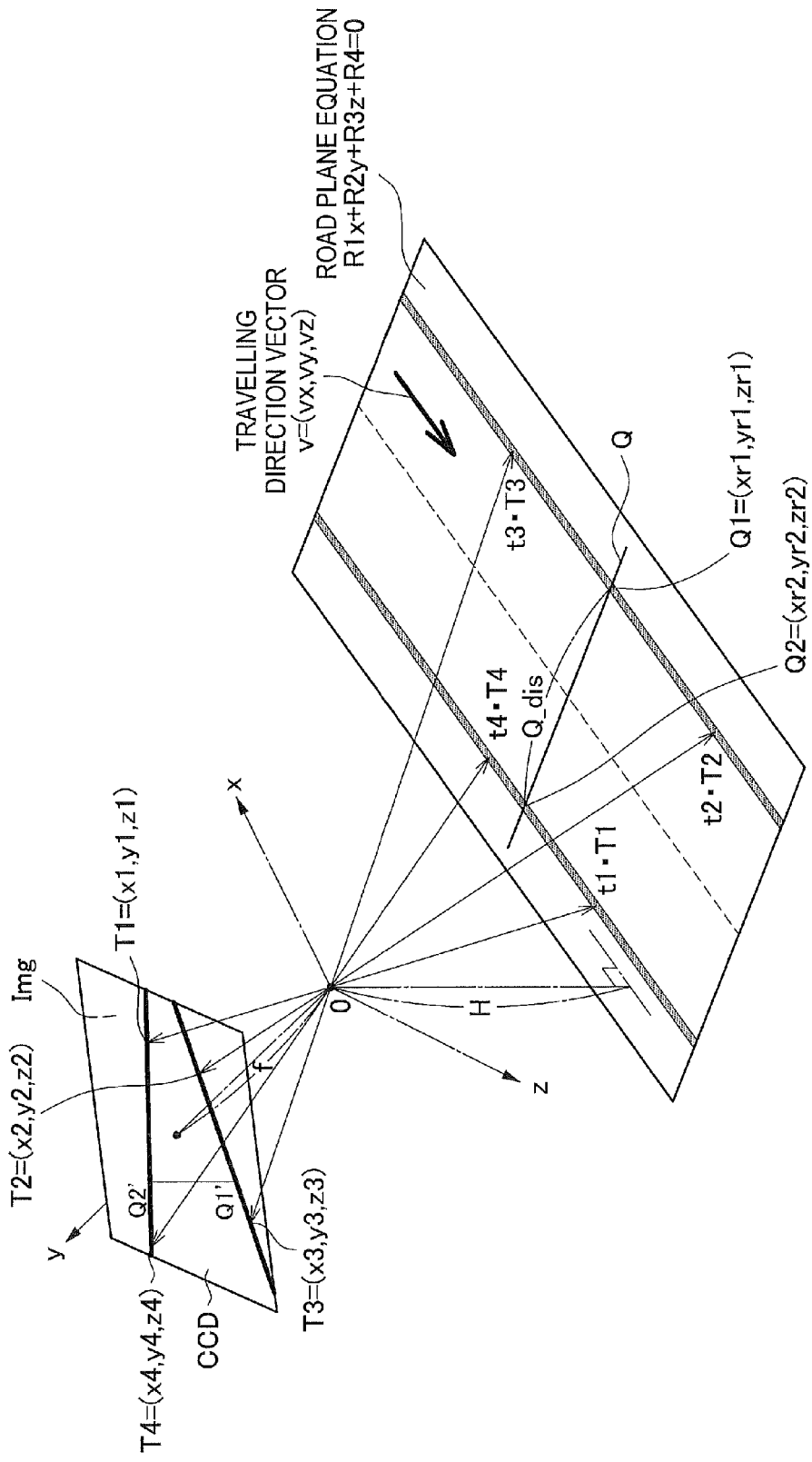
FIG. 4 is a diagram illustrating a function of the calibration section.

FIG. 4 is a diagram illustrating a function of the calibration section 111. As shown in FIG. 4, let us assume an xyz coordinate system (real space) having the origin O as a reference. In the xyz coordinate system, a road plane equation is represented by R1x+R2x+R3z+R4=0. Further, a travelling direction vector v, which is a vector showing the travelling direction of the vehicle V, is represented by (vx,vy,vz). Note that, as shown in FIG. 4, the description will be continued below on the assumption that a point (focal point) at a focal distance f away from the origin O is set on the y-axis, a plane that passes through the focal point and that is perpendicular to the y-axis is set as the imaging plane, and the captured image Img is imaged on the imaging plane. However, the settings of respective coordinate axes are not limited thereto.

On the road plane, two parallel lines are drawn in advance. Accordingly, on the captured image Img, the two parallel lines are shown. Further, on the road plane, two points Q1 and Q2 which are away from each other by a known distance Q_dis are drawn in advance. On the captured image Img, the two points Q1 and Q2 are shown as Q1'(xs1,f,zs1) and Q2' (xs2,f,zs2), respectively. Note that, in the example shown in FIG. 4, Q1 and Q2 are drawn as points on the respective two parallel lines on the road plane, however, Q1 and Q2 are not particularly limited as long as they are points on the road plane.

Further, of the two lines shown in the captured image Img, two points that a first line passes through are represented by T1(x1,y1,z1) and T4(x4,y4,z4), and two points that a second line passes through are represented by T2(x2,y2,z2) and T3(x3,y3,z3). Then, as shown in FIG. 4, the coordinates of the intersection points of lines, which connect respective T1, T2, T3, and T4 to the origin O, with the road plane are represented by t1·T1, t2·T2, t3·T3, and t4·T4, respectively. For example, the calibration section 111 can perform calibration based on the following Precondition 1.

Precondition 1

Condition 1: Direction vectors of the two parallel lines on the road plane are the same as each other.

Condition 2: The roll of the imaging section 170 is 0.

Condition 3: The distance from the origin O to the road plane is represented by a height H.

Condition 4: Q1 and Q2 are present on the road plane, which are away from each other by Q_dis.

Note that the roll being 0 means the state in which the imaging section is installed in a manner that an object placed in the perpendicular direction to the road plane is shown in the vertical direction also on the captured image.

The calibration section 111 can deduce the relational expressions shown in the following Equation 2 and Equation 3, based on the various types of data acquired as shown above and Condition 1.

$$\frac{(x2 \cdot t2 - x1 \cdot t1)}{(x4 \cdot t4 - x3 \cdot t3)} = \frac{(f \cdot t2 - f \cdot t1)}{(f \cdot t4 - f \cdot t3)} \quad \text{(Equation 2)}$$

$$\frac{(x2 \cdot t2 - x1 \cdot t1)}{(x4 \cdot t4 - x3 \cdot t3)} = \frac{(z2 \cdot t2 - z1 \cdot t1)}{(z4 \cdot t4 - z3 \cdot t3)} \quad \text{(Equation 3)}$$

Further, the calibration section 111 can deduce the relational expression shown in the following Equation 4 based on the various types of data acquired as shown above and Condition 2. Note that, when in the state where the roll is 0, since the component of a perpendicular with respect to the road plane in the axis direction (x-axis direction in the example shown in FIG. 4) that is parallel with the road plane equation is 0, the calculation formula is simplified (for example, when the component of the perpendicular in the x-axis direction is 0, the calculation can be carried out under the condition that R1=0).

$$(ft2-ft1)\cdot(z1\cdot t1-z3\cdot t3)-(z2\cdot t2-z1\cdot t1)\cdot(ft1-ft3)=0 \quad \text{(Equation 4)}$$

Further, the calibration section 111 can deduce the relational expression shown in the following Equation 5 based on the various types of data acquired as shown above and Condition 3.

$$H=-(R4)\sqrt{R1\cdot R1+R2\cdot R2+R3\cdot R3} \quad \text{(Equation 5)}$$

Further, the calibration section 111 can deduce the relational expressions shown in the following Equation 6 and Equation 7, based on the various types of data acquired as shown above and Condition 4.

$$K1 = \frac{-R4}{(R1\cdot xs1\cdot\text{pix\_dot}+R2\cdot f+R3\cdot zs1\cdot\text{pix\_dot})} \quad \text{(Equation 6)}$$

$$K2 = \frac{-R4}{(R1\cdot xs2\cdot\text{pix\_dot}+R2\cdot f+R3\cdot zs2\cdot\text{pix\_dot})} \quad \text{(Equation 7)}$$

Here, K1 represents a value by which the distance from the origin O to Q1'(xs1,f,zs1) on the captured image Img is multiplied to obtain the distance from the origin O to Q1(xr1,yr1,zr1) on the road plane. In the same manner, K2 represents a value by which the distance from the origin O to Q2'(xs2,f,zs2) on the captured image Img is multiplied to obtain the distance from the origin O to Q2(xr2,yr2,zr2) on the road plane. Accordingly, the relational expression show in the following Equation 8 can be deduced.

$$xr1=xs1\cdot K1$$

$$yr1=f\cdot K1$$

$$zr1=zs1\cdot K1$$

$$xr2=xs2\cdot K2$$

$$yr2=f\cdot K2$$

$$zr2=zs2\cdot K2 \quad \text{(Equation 8)}$$

The calibration section 111 can calculate a measurement value Q_dis' of a distance between two points (Q1 and Q2) on the road plane based on the relational expression shown in Equation 8, by using the following Equation 9.

$$Q\_dis' = \sqrt{(xr1-xr2)^2+(yr1-yr2)^2+(zr1-zr2)^2} \quad \text{(Equation 9)}$$

The calibration section 111 can calculate R1, R2, R3, and R4 when the difference between the measurement value Q_dis' and the known size Q_dis becomes the minimum, based on Equations 1 to 9. R1, R2, R3, and R4 are calculated in this way, and thus, the road plane equation R1x+R2x+R3z+R4=0 is determined.

The technique of calculating the road plane equation described above is merely an example. Accordingly, it is also possible that the calibration section 111 calculates the road plane equation using another technique. For example, if the distance between the two parallel lines on the road plane is known, the road plane equation can be calculated by using the distance between the two parallel lines on the road plane and not using Condition 2.

Further, the calibration section 111 can also calculate a travelling direction vector v(vx,vy,vz). In more detail, the calibration section 111 calculates the direction of at least one line out of the two parallel lines on the road plane, and can thereby calculate the travelling direction vector v. For example, the calibration section 111 may calculate the difference between coordinates t2·T2 and coordinates t3·T3 as the travelling direction vector v, and may calculate the difference between coordinates t1·T1 and coordinates t4·T4 as the travelling direction vector v.

Using the technique described above, the calibration section 111 can perform calibration. The road plane equation R1x+R2x+R3z+R4=0 and the travelling direction vector v(vx,vy,vz), which are calculated by such calibration, can be used for vehicle type identification.

Figure 5:
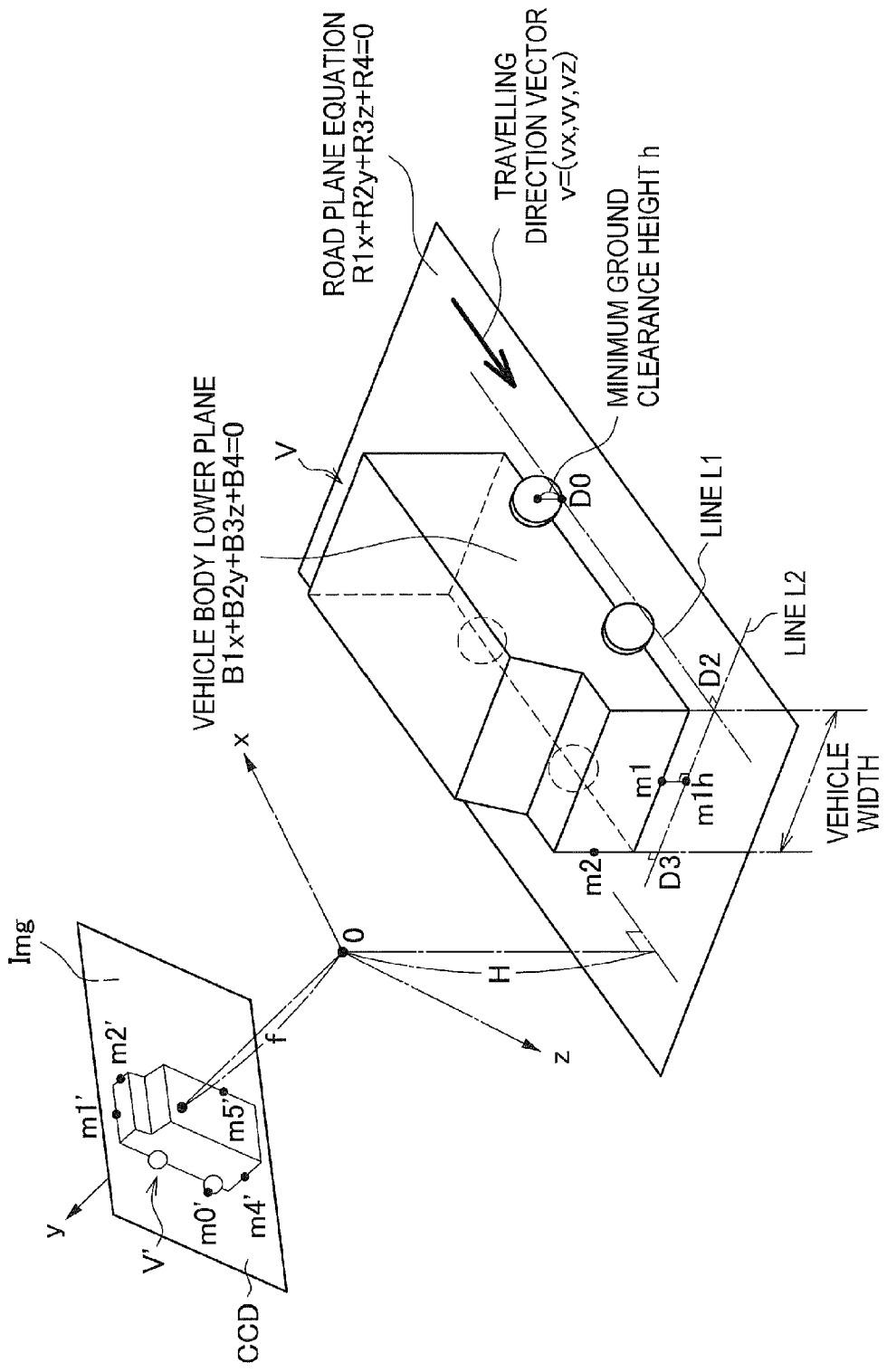
FIG. 5 is a diagram illustrating functions of a detection section and a vehicle width estimation section.

Subsequently, there will be described detection of feature points of the vehicle V on the imaging plane performed by the detection section 112A. FIG. 5 is a diagram illustrating functions of the detection section 112A and the vehicle width estimation section 113. As shown in FIG. 5, the detection section 112A detects a ground point m0', a minimum ground clearance point m1', a first endpoint m2', a second endpoint m4', and an upper endpoint m5' on the imaging plane, based on a vehicle region extracted from the captured image Img.

The vehicle region may be extracted in any way by the detection section 112A, and, for example, the vehicle region may be a silhouette extracted using a difference between the captured image Img before the vehicle V is shown therein and the captured image Img after the vehicle V is shown therein, or using a difference with a background image ImgBack.

The ground point m0' is a point at which the vehicle V and the road plane come into contact with each other. The minimum ground clearance point m1' is the lowest point of the body of the vehicle V in terms of the height from the ground. The first endpoint m2' is either a left or right endpoint of the vehicle region. The second endpoint m4' is either the left or right endpoint of the vehicle region and is the endpoint at the opposite side of the first endpoint. The upper endpoint m5' is a point on the top surface of the vehicle V. The ground point m0' may be detected in any way, and for example, the lower part of a rear wheel shown in the captured image Img may be detected as the ground point m0'. The minimum ground clearance point m1' may be detected in any way, and for example, a point on an edge line (for example, a middle point of the edge line) at the lower part of the front surface of the vehicle body may be detected as the minimum ground clearance point m1'.

The first endpoint m2' may be detected in any way, and for example, a point on either a left or right edge line (for example, a middle point of the edge line) of a vehicle body region may be detected as the first endpoint m2'. The second endpoint m4' may be detected in any way, and for example, a point on either the left or right edge line which is at the opposite side of the edge line that the first endpoint m2' passes through (for example, a middle point of the edge line) of the vehicle body region may be detected as the second endpoint m4'. The upper endpoint m5' may be detected in any way, and for example, a point on an edge line of the top surface of the vehicle body (for example, a middle point of the edge line) may be detected as the upper endpoint m5'.

Heretofore, there has been described the detection of feature points of the vehicle V on the imaging plane performed by the detection section 112A. Subsequently, with reference to FIG. 5, estimation of the width of the vehicle V performed by the vehicle width estimation section 113 will be described. The vehicle width estimation section 113 estimates a vehicle width, which indicates the width of the vehicle V in the real space, based on the ground point m0', the first endpoint m2', and the minimum ground clearance point m1' which have been detected by the detection section 112A.

In more detail, for example, the vehicle width estimation section 113 may calculate, as a minimum ground clearance point m1 in the real space, the point of intersection of the line that passes through the minimum ground clearance point m1' and the origin O with a vehicle body lower plane B1x+B2x+B3z+B4=0, and may estimate the vehicle width based on the minimum ground clearance point m1, the ground point m0', and the first endpoint m2'. For example, the vehicle body lower plane B1x+B2x+B3z+B4=0 may be a plane obtained by translating the road plane by a minimum ground clearance height h in a direction perpendicular to the road plane. In this case, since the relational expressions "B1=R1, B2=R2, B3=R3 and B4=R4+h" are satisfied, the vehicle body lower plane is calculated based on the relational expressions.

The minimum ground clearance height h may be a value which is determined in advance, and may also be a value which is set based on the detection results up to then. In the case of using the value which is determined in advance as the minimum ground clearance height h, an average value of multiple minimum ground clearance heights of respective vehicles may be used as the value which is determined in advance, for example.

Further, the vehicle width estimation section 113 may calculate, as a ground point D0 in the real space, the point of intersection of the line that passes through the ground point m0' and the origin O with the road plane on which the vehicle V is present, and may estimate the vehicle width based on a line L1, which passes through the ground point D0 and has the travelling direction vector v of the vehicle V as a direction, the minimum ground clearance point m1, and the first endpoint m2'. In more detail, the vehicle width estimation section 113 sets the foot of a perpendicular as a point m1h, the perpendicular being drawn from the minimum ground clearance point m1 on the road plane, and sets the line which passes through the point m1h and is perpendicular to the line L1 as a line L2. Further, the vehicle width estimation section 113 sets the point of intersection of the line L1 with the line L2 as a point D2.

The vehicle width estimation section 113 sets, as a first endpoint m2 in the real space, the point of intersection of the line that passes through the origin O and the first endpoint m2' with the plane that contains the line L2 and has the travelling direction vector v as the normal, and sets the foot of a perpendicular as a point D3, the perpendicular being drawn from the first endpoint m2 on the road plane. The vehicle width estimation section 113 can estimate the distance between the point D2 and the point D3 as the vehicle width. Note that, since the technique of estimating the vehicle width shown above is merely an example, the vehicle width may be estimated by using another technique. For example, although in the above-described technique the vehicle width estimation section 113 has estimated as the vehicle width the distance between the point D2 and the point D3 which are on the road plane, the vehicle width estimation section 113 may also estimate the vehicle width on the vehicle body lower plane.

Note that the travelling direction vector v having been used for defining the line L1 may be changed at the time of making a lane change by the vehicle V. Accordingly, the vehicle width estimation section 113 may correct the travelling direction vector. The travelling direction vector may be corrected in any way, and, in the case where two ground points are detected on the captured image Img by the detection section 112A, for example, the vehicle width estimation section 113 may calculate, based on the two ground points and the road plane equation, two ground points in the real space and may calculate a corrected travelling direction vector v based on the difference between the two ground points in the real space.

Figure 6:
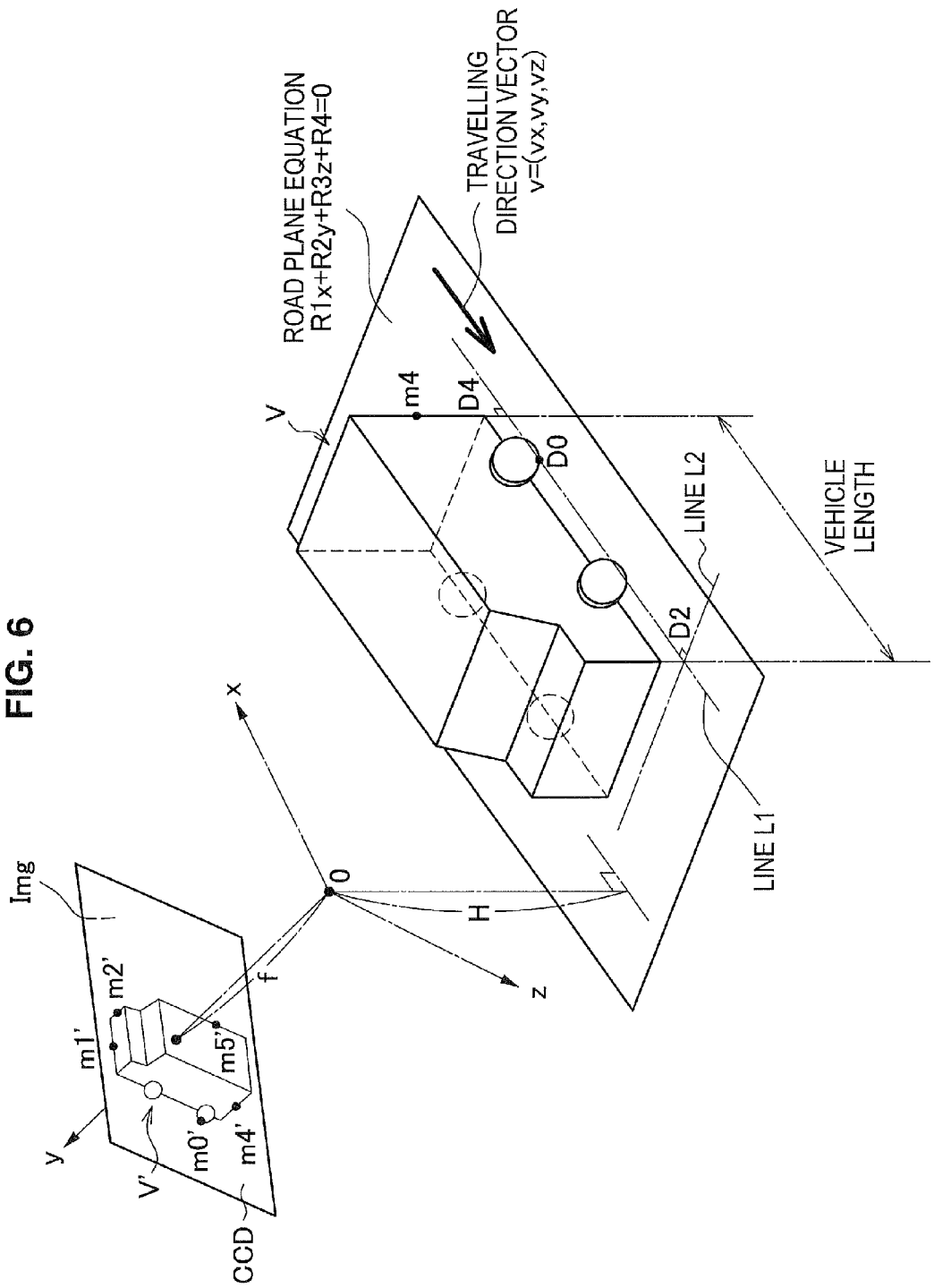
FIG. 6 is a diagram illustrating a function of a vehicle length estimation section.

Heretofore, there has been described the estimation of the width of the vehicle V performed by the vehicle width estimation section 113. Subsequently, with reference to FIG. 6, estimation of the length of the vehicle V performed by the vehicle length estimation section 114A will be described. The vehicle length estimation section 114A estimates a vehicle length, which indicates the length of the vehicle V in the real space, based on the ground point m0', the first endpoint m2', and the second endpoint m4' which have been detected by the detection section 112A.

In more detail, for example, the vehicle length estimation section 114A may estimate the vehicle length based on the line L2 (which has been estimated by the vehicle width estimation section 113 based on the ground point m0' and the first endpoint m2') and the second endpoint m4'. For example, the vehicle length estimation section 114A sets, as a second endpoint m4 in the real space, the point of intersection of the line that passes through the origin O and the second endpoint m4' with the plane that contains the line L1 and has the line L2 as the normal, and sets the foot of a perpendicular as a point D4, the perpendicular being drawn from the second endpoint m4 on the road plane. The vehicle length estimation section 114A can estimate the distance between the point D2 and the point D4 as the vehicle length.

Note that, since the technique of estimating the vehicle length shown above is merely an example, the vehicle length may be estimated by using another technique. For example, although in the above-described technique the vehicle length estimation section 114A has estimated as the vehicle length the distance between the point D2 and the point D4 which are on the road plane, the vehicle length estimation section 114A may also estimate the vehicle length on the vehicle body lower plane.

Figure 7:
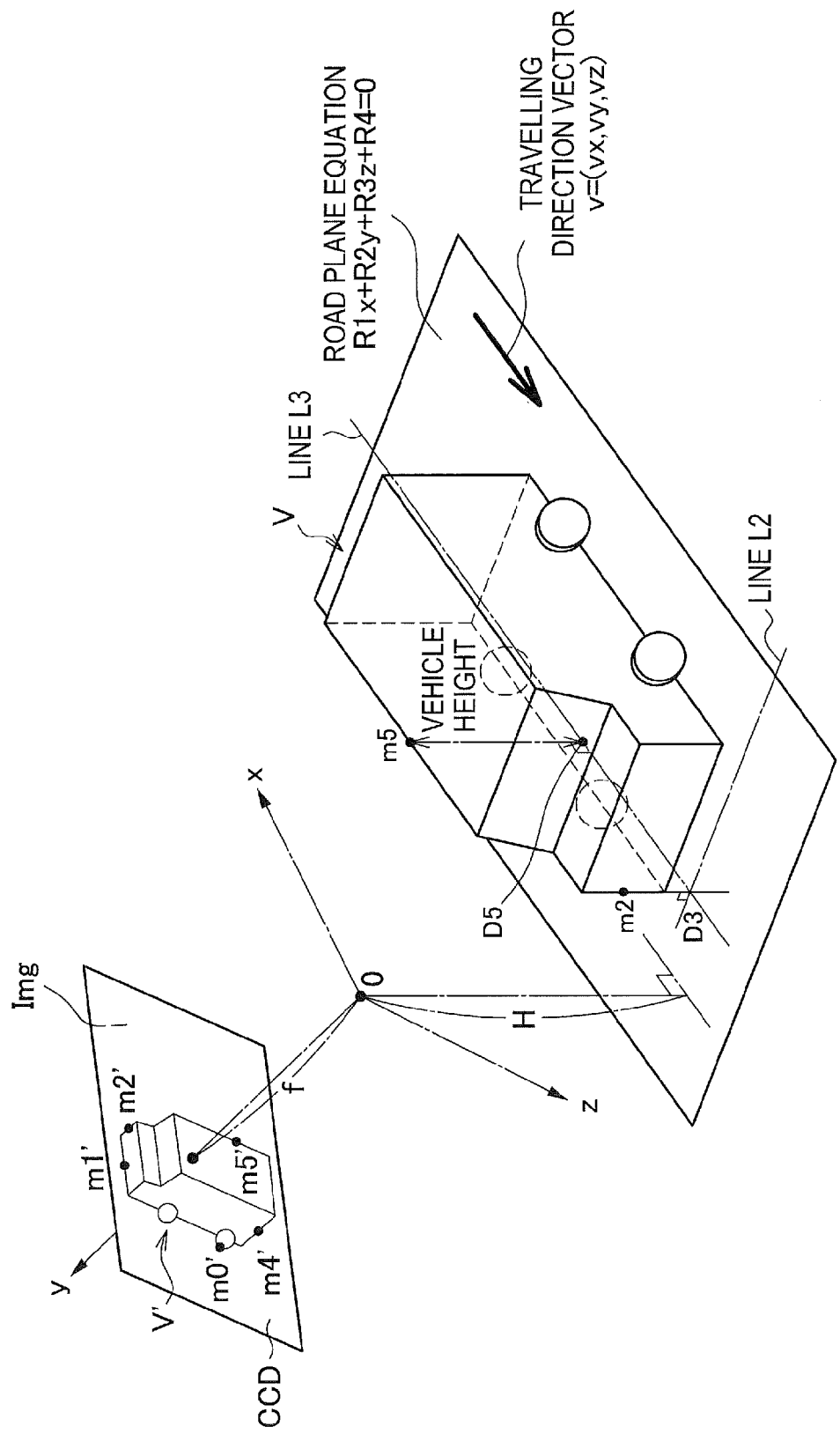
FIG. 7 is a diagram illustrating a function of a vehicle height estimation section.

Heretofore, there has been described the estimation of the length of the vehicle V performed by the vehicle length estimation section 114A. Subsequently, with reference to FIG. 7, estimation of the height of the vehicle V performed by the vehicle height estimation section 115A will be described. The vehicle height estimation section 115A estimates a vehicle height, which indicates the height of the vehicle V in the real space, based on the ground point m0', the first endpoint m2', and the upper endpoint m5' which have been detected by the detection section 112A.

In more detail, for example, the vehicle height estimation section 115A may estimate the vehicle height based on the line L2 (which has been estimated by the vehicle width estimation section 113 based on the ground point m0' and the first endpoint m2') and the upper endpoint m5'. For example, the vehicle height estimation section 115A sets, as a line L3, the line that passes through the point D3 and has the travelling direction vector v as a direction. Then, the vehicle height estimation section 115A sets, as an upper endpoint m5 in the real space, the point of intersection of the line that passes through the origin O and the upper endpoint m5' with the plane that contains the line L3 and has the line L2 as the normal, and sets the foot of a perpendicular as a point D5, the perpendicular being drawn from the upper endpoint m5 on the road plane. The vehicle height estimation section 115A can estimate the distance between the upper endpoint m5 and the point D5 as the vehicle height.

Note that, since the technique of estimating the vehicle height shown above is merely an example, the vehicle height may be estimated by using another technique. For example, although in the above-described technique the vehicle height estimation section 115A has estimated as the vehicle height the distance between the upper endpoint m5 and the point D5 which is on the road plane, the vehicle height estimation section 115A may also estimate the vehicle length by estimating the distance between the upper endpoint m5 and a point on the vehicle body lower plane and adding the minimum ground clearance height h to the estimation result.

Heretofore, there has been described the estimation of the height of the vehicle V performed by the vehicle height estimation section 115A. Subsequently, identification of a type of the vehicle V performed by the vehicle type identification section 116 will be described. The vehicle type identification section 116 identifies the type of the vehicle based on the vehicle width estimated by the vehicle width estimation section 113, the vehicle length estimated by the vehicle length estimation section 114A, and the vehicle height estimated by the vehicle height estimation section 115A.

In more detail, for example, in the case there exists a formula for determining a type of a vehicle based on the vehicle width, the vehicle length, and the vehicle height, the vehicle type identification section 116 can determine the type of the vehicle using the determination formula. For example, the determination formula may be a determination formula obtained as a result of identification analysis with respect to vehicle widths, vehicle lengths, and vehicle heights of various types of vehicles (for example, a large size vehicle and a small size vehicle) which are currently in circulation.

Note that, since the technique of identifying a type of a vehicle shown above is merely an example, the vehicle type may be identified by using another technique. For example, in the above-described technique the vehicle type identification section 116 has identified the vehicle type by using the determination formula, but in the case where there exists a table in which respective ranges of the vehicle width, the vehicle length, and the vehicle height are associated with a vehicle type, the vehicle type identification section 116 may determine the vehicle type using the table.

Figure 8:
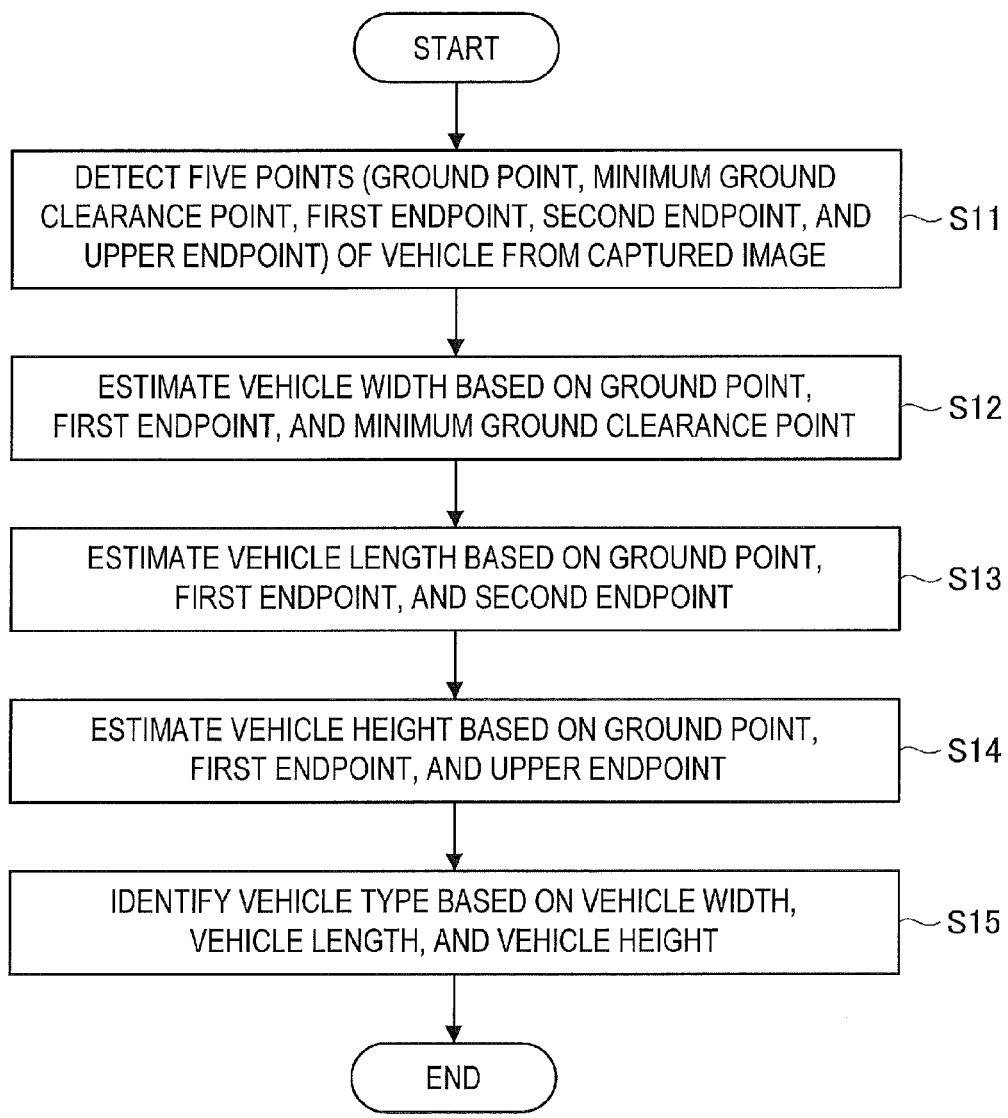
FIG. 8 is a flowchart showing operation performed by the vehicle type identification device according to the first embodiment.

Heretofore, there has been described the identification of a type of the vehicle V performed by the vehicle type identification section 116. Subsequently, operation of the vehicle type identification device 10A will be described. FIG. 8 is a flowchart showing operation performed by the vehicle type identification device 10A. Note that the operation shown in FIG. 8 is merely an example of the operation of the vehicle type identification device 10A. Accordingly, the operation of the vehicle type identification device 10A is not limited to the operation shown in FIG. 8. Further, although not shown in FIG. 8, let us assume that calibration has already been performed by the calibration section 111.

As shown in FIG. 8, when a captured image Img taken by the imaging section 170 is provided to the detection section 112A, the detection section 112A detects five points (the ground point m0', the minimum ground clearance point m1', the first endpoint m2', the second endpoint m4', and the upper endpoint m5') which are feature points of the vehicle V in the captured image Img (Step S11). Subsequently, the vehicle width estimation section 113 estimates the width of the vehicle V based on the ground point m0', the first endpoint m2', and the minimum ground clearance point m1' (Step S12).

Subsequently, the vehicle length estimation section 114A estimates the length of the vehicle V based on the ground point m0', the first endpoint m2', and the second endpoint m4' (Step S13). Subsequently, the vehicle height estimation section 115A estimates the height of the vehicle V based on the ground point m0', the first endpoint m2', and the upper endpoint m5' (Step S14). The vehicle type identification section 116 identifies the type of the vehicle V based on the vehicle width estimated by the vehicle width estimation section 113, the vehicle length estimated by the vehicle length estimation section 114A, and the vehicle height estimated by the vehicle height estimation section 115A (Step S15).

Heretofore, the first embodiment of the present invention has been described. According to the first embodiment of the present invention, a vehicle type is identified by taking into account the size of the vehicle V, and therefore, accuracy of the vehicle type identification can be enhanced. In addition, according to the first embodiment of the present invention, the vehicle width is estimated based on the detected feature points, and therefore, it is made less likely to be affected by a vehicle width estimation error caused by a shadow or the like of the vehicle V, and accuracy of the vehicle type identification can be particularly remarkably enhanced.

Description of Second Embodiment

Figure 9:
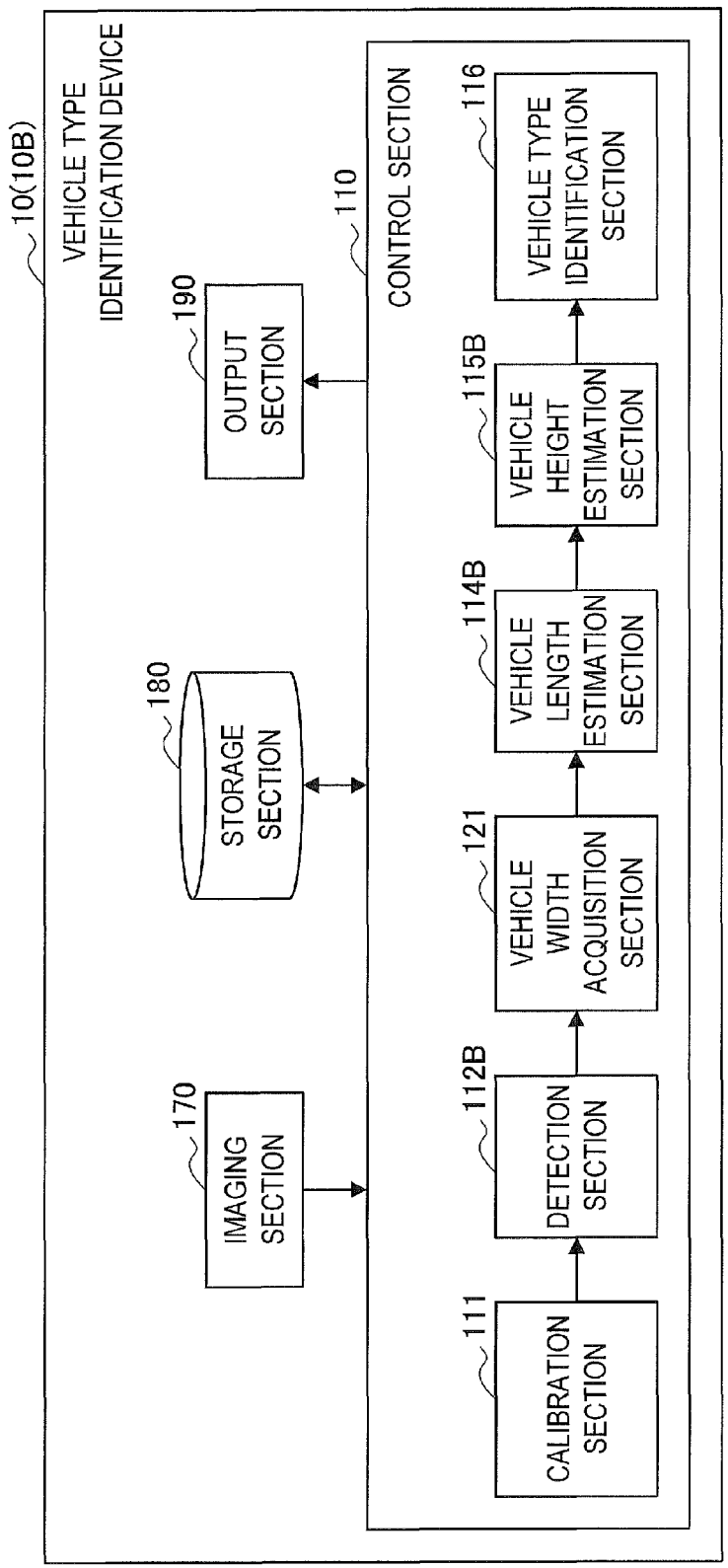
FIG. 9 is a block diagram showing a functional configuration of a vehicle type identification device according to a second embodiment.

Subsequently, a second embodiment of the present invention will be described. Although the vehicle width is estimated in the first embodiment of the present invention, in the second embodiment of the present invention, the vehicle width is not estimated, and a vehicle width which is prepared in advance is acquired and is used for the vehicle type identification. FIG. 9 is a block diagram showing a functional configuration of a vehicle type identification device 10B according to the second embodiment. As shown in FIG. 9, the vehicle type identification device 10B according to the second embodiment includes a control section 110, an imaging section 170, a storage section 180, and an output section 190.

Figure 10:
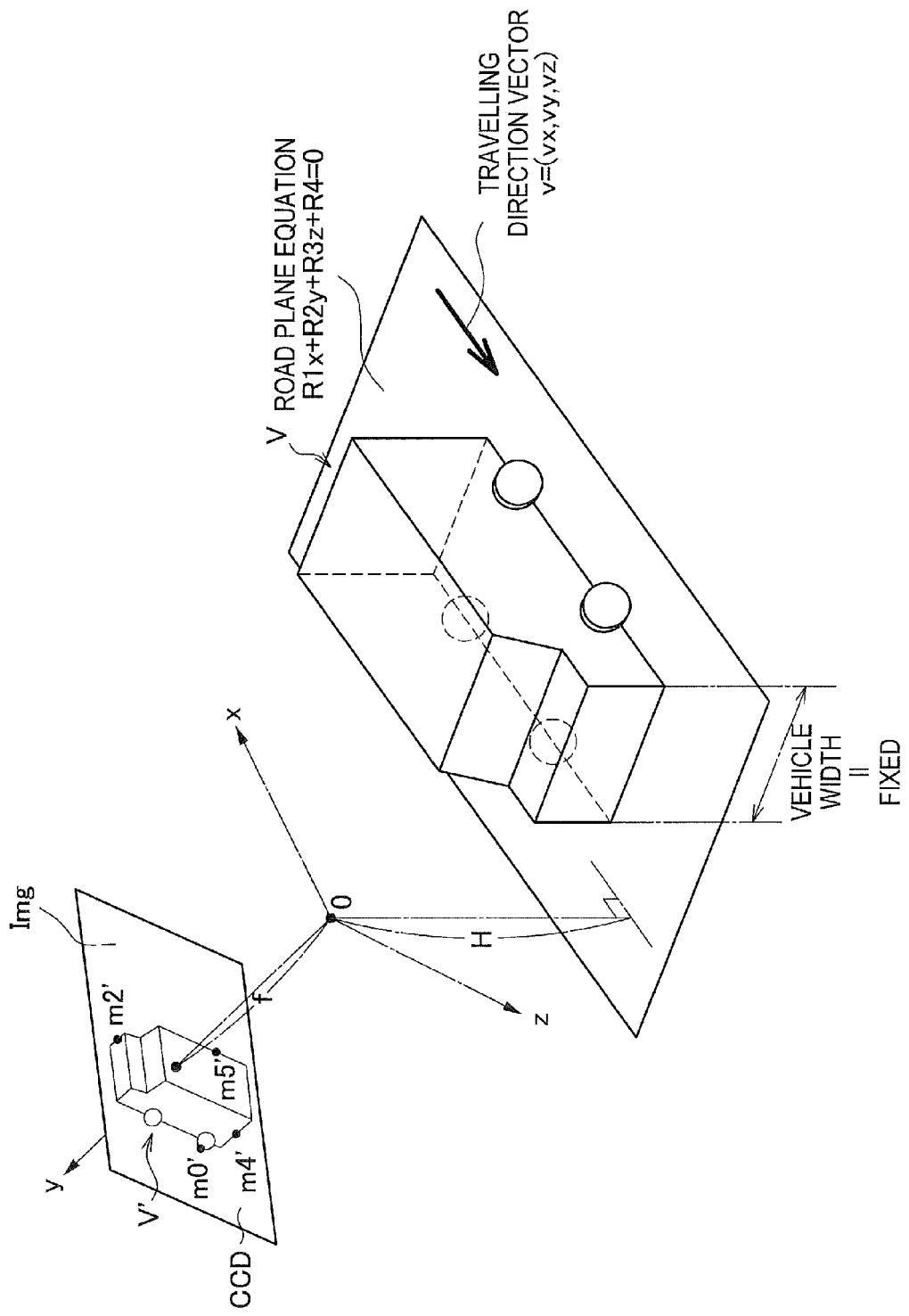
FIG. 10 is a diagram illustrating functions of a detection section and a vehicle width acquisition section.

The control section 110 includes a calibration section 111, a detection section 112B, a vehicle width acquisition section 121, a vehicle length estimation section 114B, a vehicle height estimation section 115B, and a vehicle type identification section 116. Hereinafter, of those functional sections included in the control section 110, description will be made in detail on the functional sections which differ from those of the first embodiment. FIG. 10 is a diagram illustrating functions of the detection section 112B and the vehicle width acquisition section 121. First, with reference to FIG. 10, functions of the detection section 112B and the vehicle width acquisition section 121 will be described.

As shown in FIG. 10, the detection section 112B detects a ground point m0', a first endpoint m2', a second endpoint m4', and an upper endpoint m5' on an imaging plane, based on a vehicle region extracted from a captured image Img. In the first embodiment, the minimum ground clearance point m1' is detected, but in the second embodiment, it is not particularly necessary that the minimum ground clearance point m1' be detected. The ground point m0', the first endpoint m2', the second endpoint m4', and the upper endpoint m5' may be detected by the same techniques as the detection techniques shown in the first embodiment.

Further, as shown in FIG. 10, in the second embodiment, the width of the vehicle V is already fixed. The vehicle width acquisition section 121 can acquire the vehicle width. The technique of acquiring the vehicle width is not particularly limited, and, for example, in the case where the vehicle width is stored in the storage section 180, the vehicle width acquisition section 121 may acquire the vehicle width stored in the storage section 180, and in the case where the vehicle width is stored in a device other than the vehicle type identification device 10B, the vehicle width acquisition section 121 may acquire the vehicle width transmitted from the other device. The value of the vehicle width is not particularly limited, and may be an average value of vehicle widths of various vehicle types, for example.

Heretofore, there have been described the detection of the respective feature points performed by the detection section 112B and the acquisition of the vehicle width performed by the vehicle width acquisition section 121. Subsequently, with reference to FIG. 11, estimation of the length of the vehicle V performed by the vehicle length estimation section 114B will be described. The vehicle length estimation section 114B estimates a vehicle length, which indicates the length of the vehicle V in the real space, based on the ground point m0', the first endpoint m2', and the second endpoint m4' which have been detected by the detection section 112B.

Figure 11:
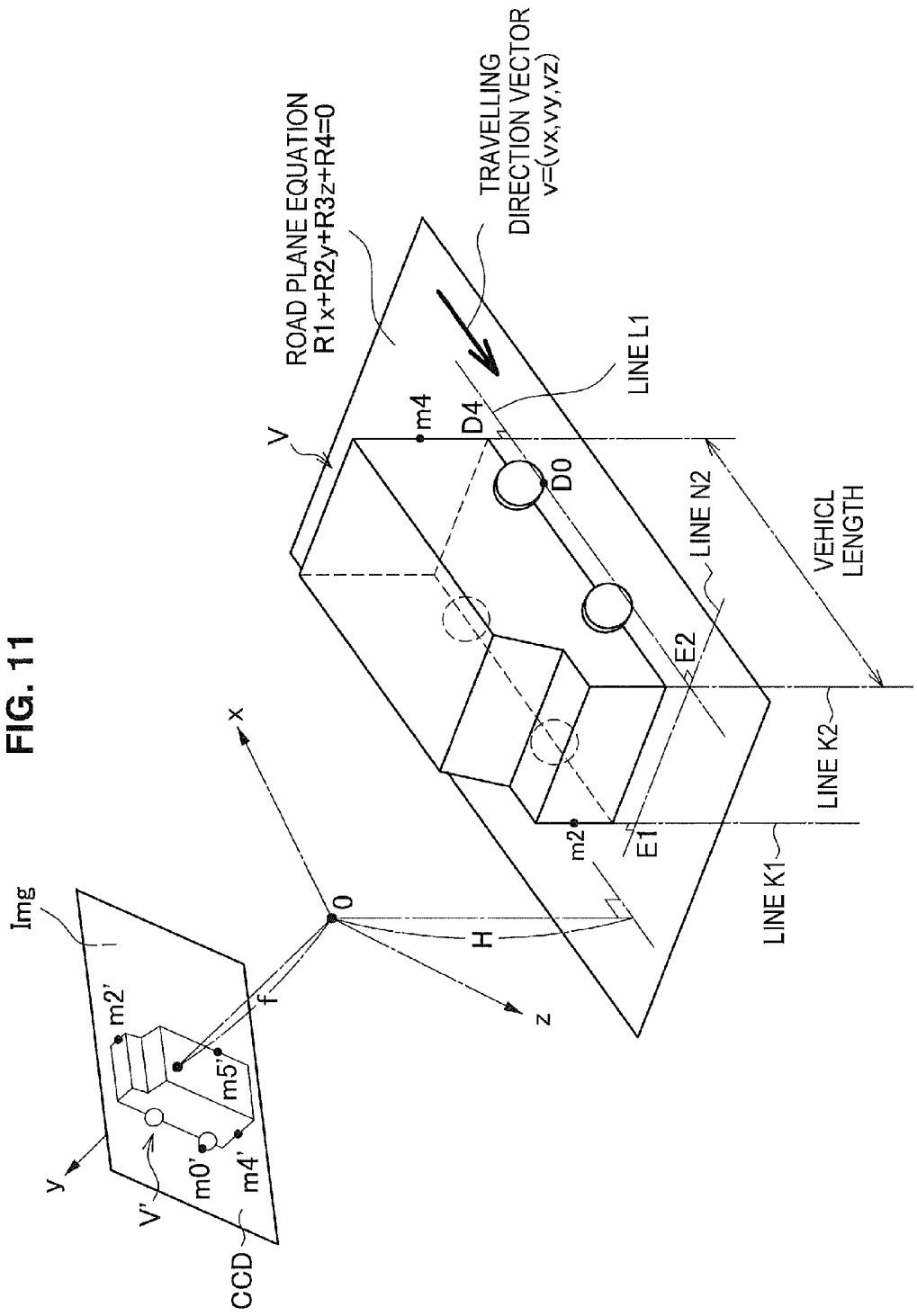
FIG. 11 is a diagram illustrating a function of a vehicle length estimation section.

In FIG. 11, the vehicle length estimation section 114B can calculate the line L1 using the same technique as that of the first embodiment. Where the line which passes through a first endpoint m2 and has a normal vector (R1,R2,R3) to the road plane as a direction is represented by a line K1, the point of intersection of the road plane with the line K1 is represented by a point $E1(x_{E1}, y_{E1}, z_{E1})$, the line which passes through the point E1 and is perpendicular to the line L1 is represented by a line N2, and the point of intersection of the line L1 with the line N2 is represented by a point $E2(x_{E2}, y_{E2}, z_{E2})$, the vehicle length estimation section 114B can calculate the point E1 and the point E2 based on the following Precondition 2, for example.

Precondition 2

Condition 1: The direction of the line K1 passing through the point E1 and the first endpoint m2 is parallel with the normal vector (R1,R2,R3), provided that the point of intersection of the line passing through the origin O and the first endpoint m2' on the imaging plane with the road plane is assumed as follows:

$$(x,y,z) = (x_{m2}, f, z_{m2})u.$$

Condition 2: The inner product of the direction vector of the line L1 and the direction vector of the line N2 is 0.

Condition 3: The distance between the point E1 and the point E2 is equal to a vehicle width W.

Condition 4: The point E1 is present on the road plane (R1x+R2x+R3z+R4=0).

The vehicle length estimation section 114B can deduce the relational expressions shown in the following Equations 10 to 14, based on Conditions 1 to 4.

$$\frac{R1}{x_{m2} \cdot u - x_{E1}} = \frac{R2}{f \cdot u - y_{E1}} \quad \text{(Equation 10)}$$

$$\frac{R3}{z_{m2} \cdot u - z_{E1}} = \frac{R2}{f \cdot u - y_{E1}} \quad \text{(Equation 11)}$$

$$(vx, vy, vz) \cdot ((x_{E1} - (vx \cdot t + x_{E2})), (y_{E1} - (vy \cdot t + y_{E2})), (z_{E1} - (vz \cdot t + z_{E2}))) = 0 \quad \text{(Equation 12)}$$

$$W \cdot W = (x_{E1} - (vx \cdot t + x_{E2}))(x_{E1} - (vx \cdot t + x_{E2})) + (y_{E1} - (vy \cdot t + y_{E2}))(y_{E1} - (vy \cdot t + y_{E2})) \quad \text{(Equation 13)}$$

$$R1 \cdot x_{E1} + R2 \cdot y_{E1} + R3 \cdot z_{E1} + R3 = 0 \quad \text{(Equation 14)}$$

The vehicle length estimation section 114B can deduce the point $E1(x_{E1}, y_{E1}, z_{E1})$ and the point $E2(x_{E2}, y_{E2}, z_{E2})$ by solving the relational expressions shown in Equations 10 to 14. The vehicle length estimation section 114B can calculate the point D4 using the same technique as the technique of the first embodiment, and can estimate the distance between the point E2 and the point D4 as the vehicle length.

Note that, since the technique of estimating the vehicle length shown above is merely an example, the vehicle length may be estimated by using another technique.

Figure 12:
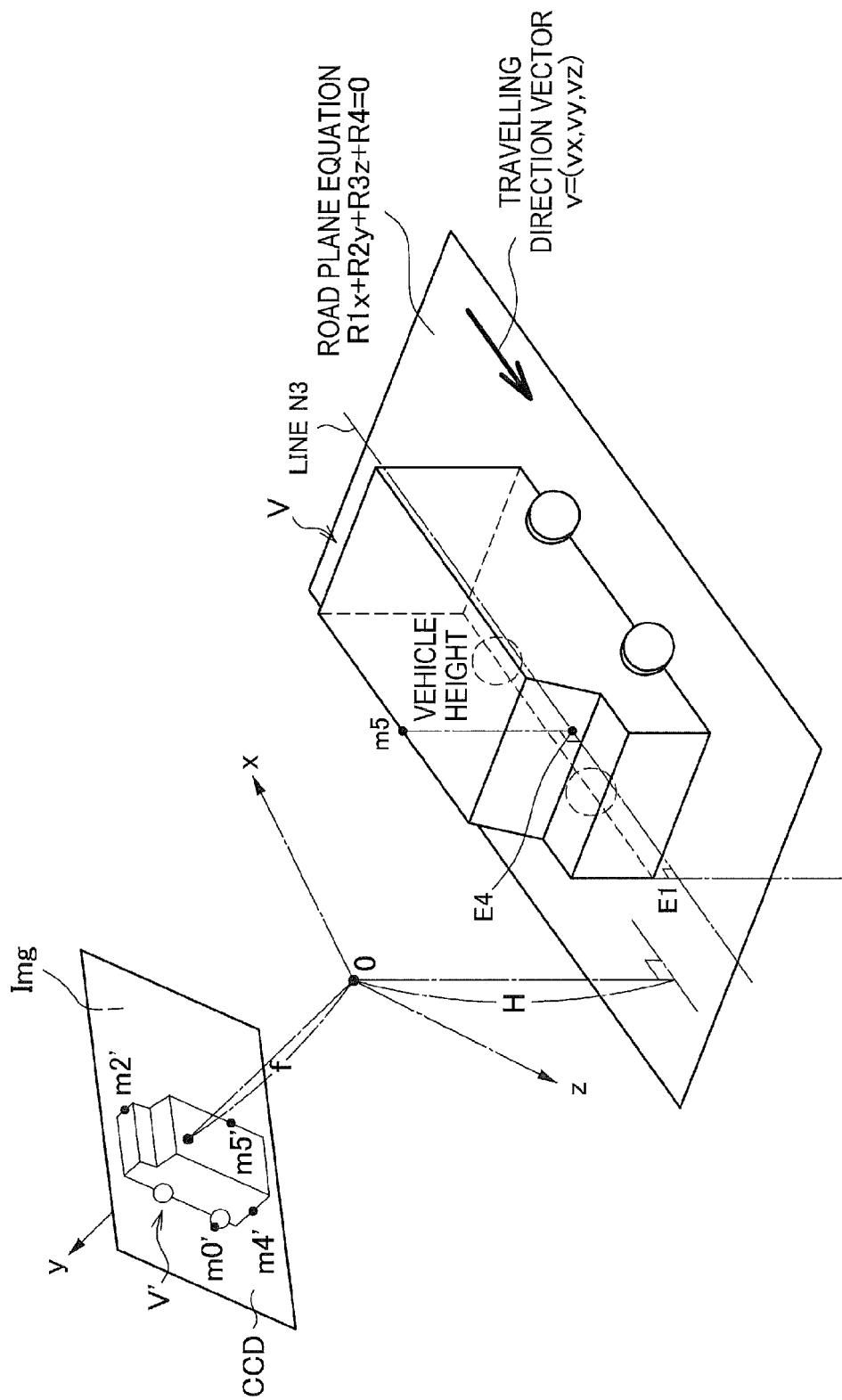
FIG. 12 is a diagram illustrating a function of a vehicle height estimation section.

Heretofore, there has been described the estimation of the length of the vehicle V performed by the vehicle length estimation section 114B. Subsequently, with reference to FIG. 12, estimation of the height of the vehicle V performed by the vehicle height estimation section 115B will be described. The vehicle height estimation section 115B estimates a vehicle height, which indicates the height of the vehicle V in the real space, based on the ground point m0', the first endpoint m2', and the upper endpoint m5' which have been detected by the detection section 112B.

In more detail, for example, the vehicle height estimation section 115B sets, as a line N3, the line that passes through the point E1 and has the travelling direction vector v as a direction. The vehicle height estimation section 115B calculates an upper endpoint m5 using the same technique as that of the first embodiment, and sets the foot of a perpendicular as a point E4, the perpendicular being drawn from the upper endpoint m5 on the line N3. The vehicle height estimation section 115B can estimate the distance between the upper endpoint m5 and the point E4 as the vehicle height.

Note that, since the technique of estimating the vehicle height shown above is merely an example, the vehicle height may be estimated by using another technique. For example, the vehicle height estimation section 115B may estimate the vehicle height using the same technique as that of the first embodiment.

Figure 13:
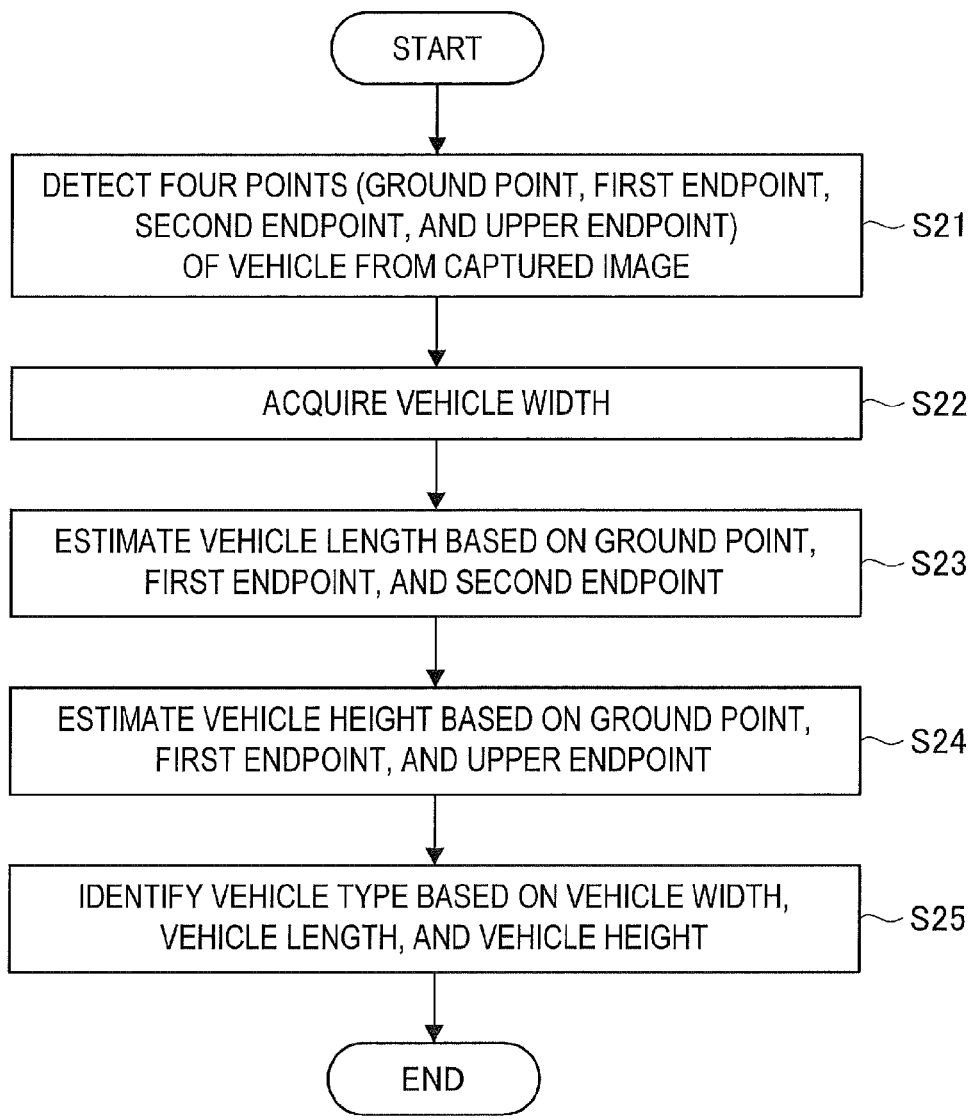
FIG. 13 is a flowchart showing operation performed by the vehicle type identification device according to the second embodiment.

Heretofore, there has been described the estimation of the height of the vehicle V performed by the vehicle height estimation section 115B. Subsequently, operation of the vehicle type identification device 10B will be described. FIG. 13 is a flowchart showing operation performed by the vehicle type identification device 10B. Note that the operation shown in FIG. 13 is merely an example of the operation of the vehicle type identification device 10B. Accordingly, the operation of the vehicle type identification device 10B is not limited to the operation shown in FIG. 13. Further, although not shown in FIG. 13, let us assume that calibration has already been performed by the calibration section 111.

As shown in FIG. 13, when a captured image Img taken by the imaging section 170 is provided to the detection section 112B, the detection section 112B detects four points (the ground point m0', the first endpoint m2', the second endpoint m4', and the upper endpoint m5') which are feature points of the vehicle V in the captured image Img (Step S21). Subsequently, the vehicle width acquisition section 121 acquires the width of the vehicle V (Step S22).

Subsequently, the vehicle length estimation section 114B estimates the length of the vehicle V based on the ground point m0', the first endpoint m2', and the second endpoint m4' (Step S23). Subsequently, the vehicle height estimation section 115B estimates the height of the vehicle V based on the ground point m0', first endpoint m2', and the upper endpoint m5' (Step S24). The vehicle type identification section 116 identifies the type of the vehicle V based on the vehicle width acquired by the vehicle width acquisition section 121, the vehicle length estimated by the vehicle length estimation section 114B, and the vehicle height estimated by the vehicle height estimation section 115B (Step S25).

Heretofore, the second embodiment of the present invention has been described. According to the second embodiment, the vehicle type is identified by taking into account the size of the vehicle V, and therefore, accuracy of the vehicle type identification can be enhanced. In addition, according to the second embodiment of the present invention, the vehicle width is not estimated and a vehicle width which is prepared in advance is acquired, and therefore, the work necessary for the processing of estimating the vehicle width can be reduced, and the speed of the vehicle type identification can be enhanced.

Description of Third Embodiment

Figure 14:
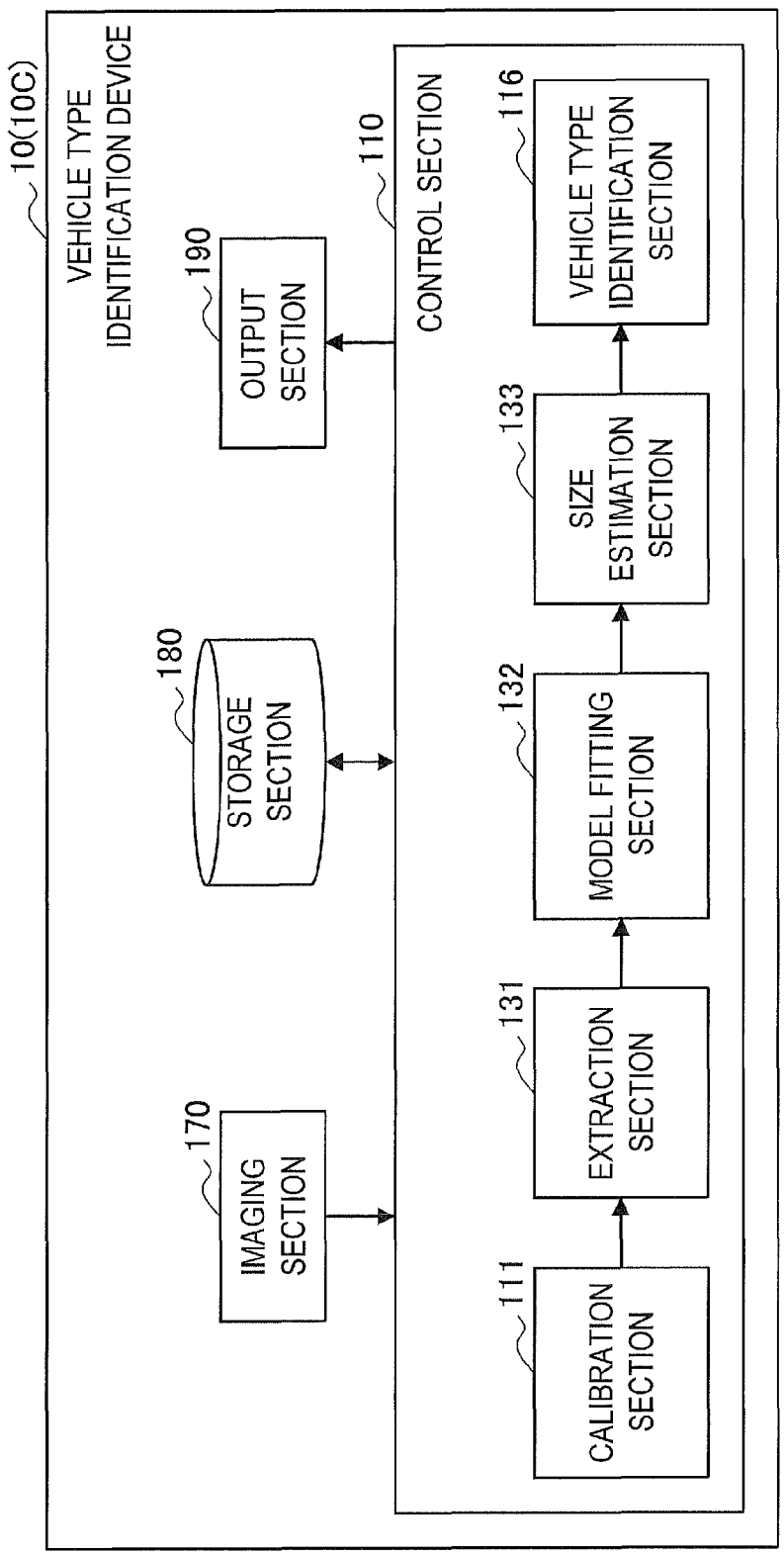
FIG. 14 is a block diagram showing a functional configuration of a vehicle type identification device according to a third embodiment.

Subsequently, a third embodiment of the present invention will be described. In the third embodiment of the present invention, multiple vehicle models are prepared, and a vehicle type is identified based on a vehicle model that is selected by checking a vehicle region extracted from a captured image against the multiple vehicle models. FIG. 14 is a block diagram showing a functional configuration of a vehicle type identification device 10C according to the third embodiment. As shown in FIG. 14, the vehicle type identification device 10C according to the third embodiment includes a control section 110, an imaging section 170, a storage section 180, and an output section 190.

Figure 15:
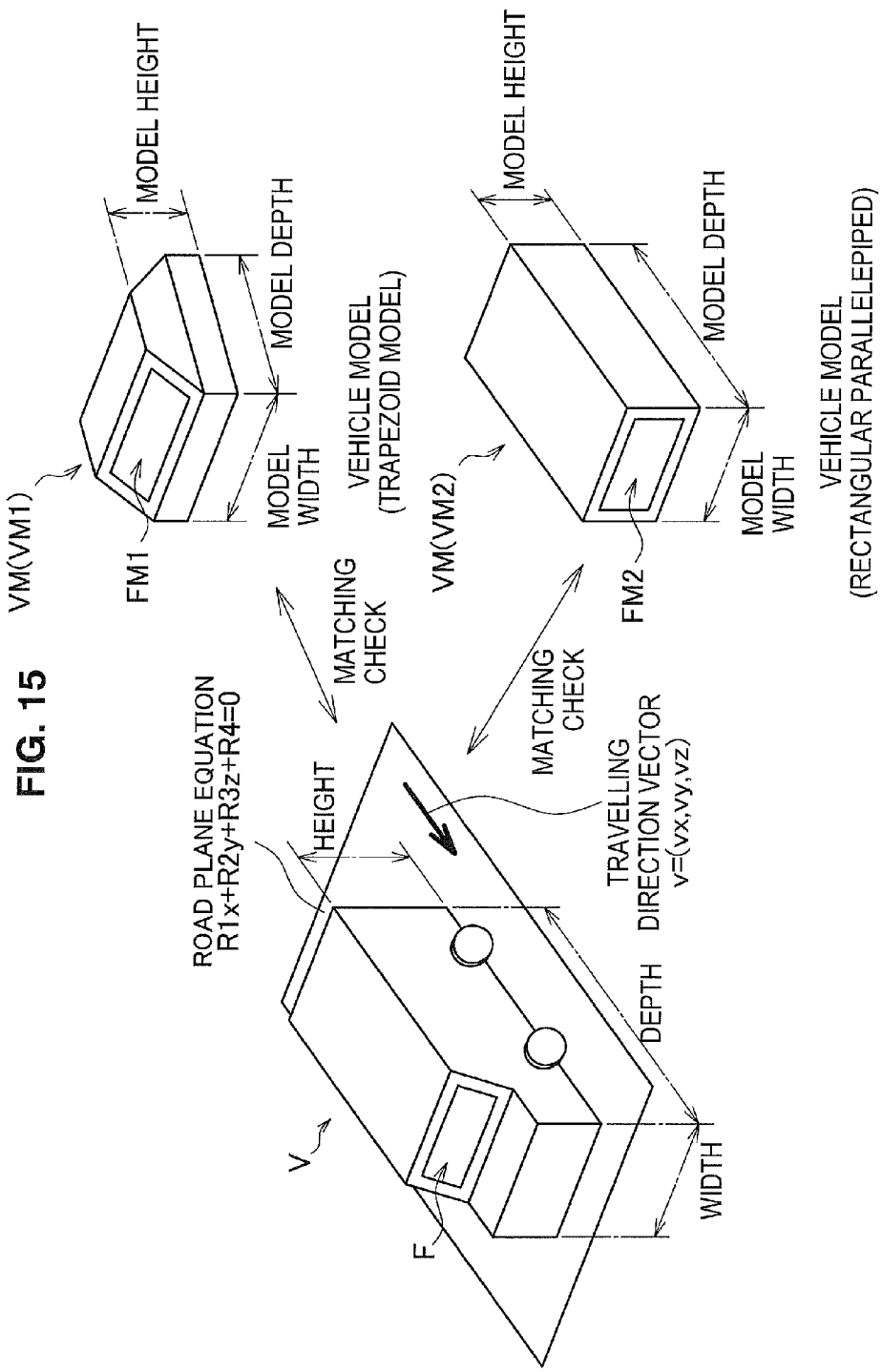
FIG. 15 is a diagram illustrating functions of a detection section, a model fitting section, and a size estimation section.

The control section 110 includes a calibration section 111, an extraction section 131, a model fitting section 132, a size estimation section 133, and a vehicle type identification section 116. Hereinafter, of those functional sections included in the control section 110, description will be made in detail on the functional sections which differ from those of the first embodiment and the second embodiment. FIG. 15 is a diagram illustrating functions of the extraction section 131, the model fitting section 132, and the size estimation section 133. With reference to FIG. 15, functions of the extraction section 131, the model fitting section 132, and the size estimation section 133 will be described.

The extraction section 131 can extract a vehicle region using the same technique as that of the first embodiment, for example. The model fitting section 132 checks the vehicle region extracted by the extraction section 131 against multiple vehicle models VM that are registered in advance, and thus selects a vehicle model VM. In the case where the multiple vehicle models VM are stored in the storage section 180, the multiple vehicle models VM stored in the storage section 180 may be acquired, and in the case where the multiple vehicle models VM are stored in a device other than the vehicle type identification device 10C, the multiple vehicle models VM transmitted from the other device may be acquired.

Each of the multiple vehicle models VM may have any shape, and for example, as shown in FIG. 15, may be a trapezoid model VM1 that has a shape of a trapezoid and may be a rectangular parallelepiped VM2 that has a shape of a rectangular parallelepiped. Each of the multiple vehicle models VM has a model width, a model depth, and a model height. The model fitting section 132 checks the vehicle region of the vehicle V against the multiple vehicle models VM.

For example, in a state where the directions of the multiple vehicle models VM are adjusted to the direction of the vehicle V, the model fitting section 132 may check each of the vehicle regions, which are obtained from images of the multiple vehicle models VM taken in the same imaging direction as the captured image Img, against the vehicle region extracted by the extraction section 131. In this case, the model fitting section 132 may adjust the directions of the multiple vehicle models VM to the direction of the vehicle V by rotating the multiple vehicle models VM in accordance with the travelling direction vector v(vx,vy,vz) of the vehicle V, for example.

As a result of the matching check, the vehicle model VM, which has the vehicle region having a shape that is most similar to the shape of the vehicle region extracted by the extraction section 131, may be selected. The size of the vehicle region extracted by the extraction section 131 may be subjected to the matching check after having been changed in accordance with each of the multiple vehicle models VM. The vehicle region having the most similar shape may be the vehicle region which has the largest overlapped area with the vehicle region extracted by the extraction section 131.

In this way, the model fitting section 132 may check shapes of vehicle regions against each other, and may also perform matching check using another technique. Alternatively, the matching check may also be performed by a combination with another technique. As the other technique, there may be employed a technique of checking textures of vehicle regions against each other. As shown in FIG. 15, for example, the model fitting section 132 may check the texture of a front surface F of the vehicle V against the textures of front surfaces FM1 and FM2 of the vehicle models VM.

In particular, since a windscreen is fitted on the front surface of a vehicle, the front surface of the vehicle is suitable as a part for the matching check, but the part for the matching check is not limited to the front surface of the vehicle. For example, the part for the matching check may be the rear surface of the vehicle, or a side surface of the vehicle. Note that as a technique for the model fitting, an active shape model (ASM) or the like can also be used. This technique is described in detail in the following: "Active shape models—their training and application", T. F. Cootes and C. J. Taylor and D. H. Cooper and J. Graham (1995). Computer Vision and Image Understanding (61): 38-59.

The size estimation section 133 estimates the vehicle width, the vehicle length, and the vehicle height of the vehicle V based on the vehicle model VM selected by the model fitting section 132. In more detail, the size estimation section 133 sets the model width, the model depth, and the model height of the vehicle model VM as the width, the depth, the height of the vehicle V, and, based on the width, the depth, the height of the vehicle V, estimates the vehicle width, the vehicle length, and the vehicle height. For example, the size estimation section 133 can set the width of the vehicle V as the vehicle width, the depth of the vehicle V as the vehicle length, and can set the value obtained by adding a minimum ground clearance height h to the height as the vehicle height. The minimum ground clearance height h is as described in the first embodiment.

Figure 16:
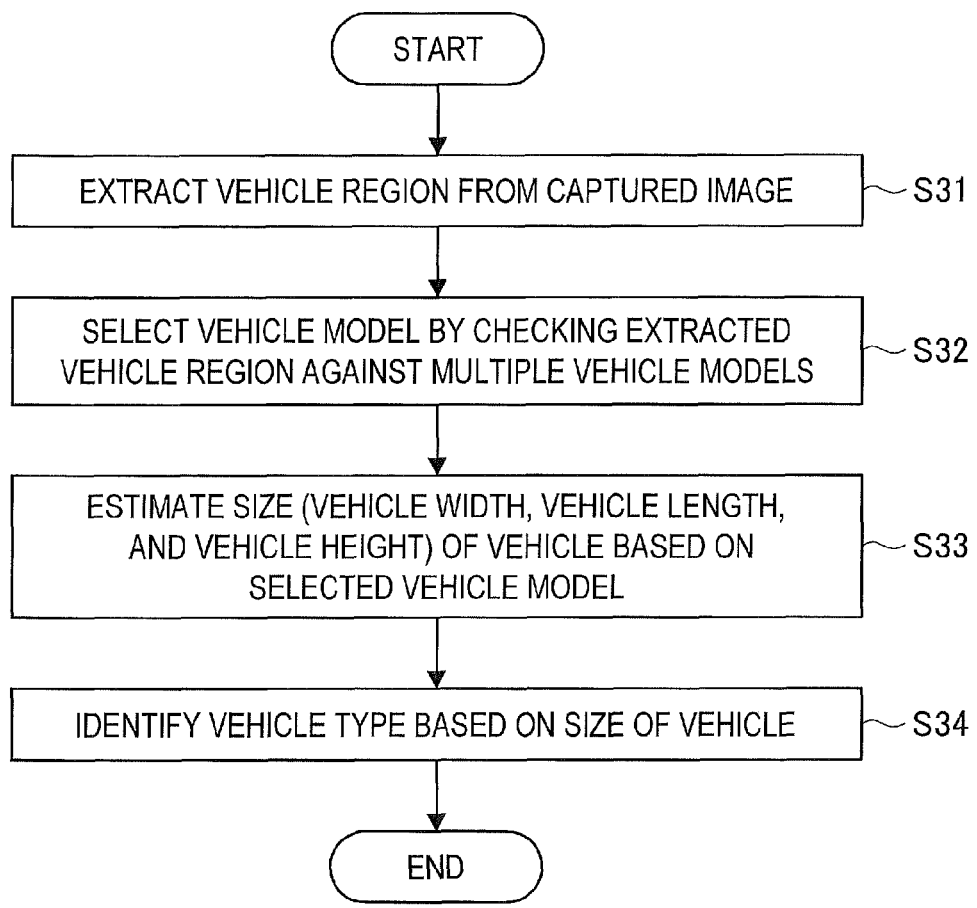
FIG. 16 is a flowchart showing operation performed by the vehicle type identification device according to the third embodiment.

Heretofore, there have been described the functions of the extraction section 131, the model fitting section 132, and the size estimation section 133. Subsequently, operation of the vehicle type identification device 10C will be described. FIG. 16 is a flowchart showing operation performed by the vehicle type identification device 10C. Note that the operation shown in FIG. 16 is merely an example of the operation of the vehicle type identification device 10C. Accordingly, the operation of the vehicle type identification device 10C is not limited to the operation shown in FIG. 16. Further, although not shown in FIG. 16, let us assume that calibration has already been performed by the calibration section 111.

As shown in FIG. 16, when a captured image Img taken by the imaging section 170 is provided to the extraction section 131, the extraction section 131 extracts a vehicle region from the captured image Img (Step S31). Subsequently, the model fitting section 132 checks the vehicle region extracted by the extraction section 131 against multiple vehicle models VM, and thus selects a vehicle model VM (Step S32).

Subsequently, the size estimation section 133 estimates the size (the vehicle width, the vehicle length, and the vehicle height) of the vehicle V based on the vehicle model VM selected by the model fitting section 132 (Step S33). Subsequently, the vehicle type identification section 116 identifies the type of the vehicle V based on the size (the vehicle width, the vehicle length, and the vehicle height) of the vehicle V estimated by the size estimation section 133 (Step S34).

Heretofore, the third embodiment of the present invention has been described. According to the third embodiment, the vehicle type is identified by taking into account the size of the vehicle V, and therefore, accuracy of the vehicle type identification can be enhanced. In addition, according to the third embodiment of the present invention, it is not necessary to detect feature points of a vehicle from the captured image, and therefore, the vehicle type identification can be performed more stably.

Description of Modified Example

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

For example, in the example described above, the vehicle type has been identified when the front surface and the left side surface of the vehicle are shown in the captured image. However, also when the front surface and the right side surface of the vehicle are shown in the captured image, the vehicle type can also be identified using the same technique. Further, also when the vehicle is imaged from the back, the vehicle type can be identified using the same technique. For example, also when the rear surface and the left side surface of the vehicle are shown in the captured image, the vehicle type can be identified using the same technique. Further, for example, also when the rear surface and the right side surface of the vehicle are shown in the captured image, the vehicle type can be identified using the same technique.

For example, the respective blocks constituting the control section 110 of the vehicle type identification device 10 may be configured from a CPU (Central Processing Unit), a RAM (Random Access Memory), and the like, and the functions thereof may be realized by a program stored in the storage section 180 being developed in the RAM and being executed by the CPU. Alternatively, the respective blocks constituting the control section 110 may be configured from dedicated hardware and may be configured from a combination of multiple pieces of hardware.

Note that, in the present specification, the steps written in the flowchart may of course be processed in chronological order in accordance with the stated order, but may not necessarily be processed in the chronological order, and may be processed individually or in a parallel manner. It is needless to say that, in the case where the steps are processed in the chronological order, the order of the steps may be changed appropriately according to circumstances.

What is claimed is:

1. A vehicle type identification device comprising:
   a detection section which detects, based on a vehicle region extracted from a captured image, on an imaging plane, a ground point that is a point at which the vehicle and a road plane come into contact with each other, a first endpoint that is a left or right endpoint of the vehicle region, a minimum ground clearance point of the vehicle, a second endpoint that is the left or right endpoint of the vehicle region and is the endpoint at an opposite side of the first endpoint, and an upper endpoint that is a point on a top surface of the vehicle;
   a vehicle width estimation section which estimates a vehicle width indicating a width of the vehicle based on the ground point, the first endpoint, and the minimum ground clearance point which have been detected by the detection section;
   a vehicle length estimation section which estimates a vehicle length indicating a length of the vehicle based on the ground point, the first endpoint, and the second endpoint which have been detected by the detection section;
   a vehicle height estimation section which estimates a vehicle height indicating a height of the vehicle based on the ground point, the first endpoint, and the upper endpoint which have been detected by the detection section; and
   a calibration section which, based on the captured image, determines a road plane equation corresponding to a road on which the vehicle is present,
   wherein based at least partly on the road plane equation and the ground point, the vehicle type identification device determines three-dimensional coordinates of the vehicle.

2. The vehicle type identification device according to claim 1,
   wherein the vehicle width estimation section estimates the vehicle width indicating the width of the vehicle in a real space;
   the vehicle length estimation section estimates the vehicle length indicating the length of the vehicle in the real space;
   the vehicle height estimation section estimates the vehicle height indicating the height of the vehicle in the real space.

3. The vehicle type identification device according to claim 1,
   wherein the vehicle width estimation section calculates, as a minimum ground clearance point, a point of intersection of a line which passes through the minimum ground clearance point and an origin with a vehicle body lower plane obtained by translating a road plane by a minimum ground clearance height in a direction perpendicular to the road plane, and estimates a vehicle width based on the minimum ground clearance point in the real space, the ground point, and the first endpoint.

4. The vehicle type identification device according to claim 1,
   wherein the vehicle width estimation section calculates as the minimum ground clearance point in the real space.

5. The vehicle type identification device according to claim 3,
   wherein the vehicle width estimation section calculates, as a ground point in the real space, a point of intersection of a line which passes through the ground point and the origin with a road plane on which the vehicle is present, and estimates a vehicle width based on a line which passes through the ground point in the real space and has a travelling direction vector of the vehicle as a direction, the minimum ground clearance point in the real space, and the first endpoint.

6. The vehicle type identification device according to claim 1,
    wherein the vehicle type identification device further comprises a vehicle type identification section which identifies a type of the vehicle based on the vehicle width, the vehicle length, and the vehicle height.

7. A vehicle type identification device comprising:
    a detection section which detects, based on a vehicle region extracted from a captured image, on an imaging plane, a ground point that is a point at which the vehicle and a road plane come into contact with each other, a first endpoint that is a left or right endpoint of the vehicle region, a second endpoint that is the left or right endpoint of the vehicle region and is the endpoint at an opposite side of the first endpoint, and an upper endpoint that is a point on a top surface of the vehicle;
    a vehicle width acquisition section which acquires a vehicle width indicating a width of the vehicle;
    a vehicle length estimation section which estimates a vehicle length indicating a length of the vehicle based on the ground point, the first endpoint, and the second endpoint which have been detected by the detection section;
    a vehicle height estimation section which estimates a vehicle height indicating a height of the vehicle in the real space based on the ground point, the first endpoint, and the upper endpoint which have been detected by the detection section; and
    a calibration section which, based on the captured image, determines a road plane equation corresponding to a road on which the vehicle is present,
    wherein based at least partly on the road plane equation and the ground point, the vehicle type identification device determines three-dimensional coordinates of the vehicle.

8. The vehicle type identification device according to claim 7,
    wherein the vehicle width acquisition section acquires the vehicle width indicating the width of the vehicle in a real space;
    the vehicle length estimation section estimates the vehicle length indicating the length of the vehicle in the real space;
    the vehicle height estimation section estimates the vehicle height indicating the height of the vehicle in the real space.

9. The vehicle type identification device according to claim 7
    wherein the vehicle type identification device further comprises a vehicle type identification section which identifies a type of the vehicle based on the vehicle width, the vehicle length, and the vehicle height.

10. A vehicle type identification device comprising:
    an extraction section which extracts a vehicle region from a captured image;
    a model fitting section which selects a model by checking the vehicle region extracted by the extraction section against a plurality of models that are registered in advance;
    a size estimation section which estimates a vehicle width indicating a width of the vehicle, a vehicle length indicating a length of the vehicle, and a vehicle height indicating a height of the vehicle based on the model selected by the model fitting section;
    a vehicle type identification section which identifies a type of the vehicle based on the vehicle width, the vehicle length, and the vehicle height; and
    a calibration section which, based on the captured image, determines a road plane equation corresponding to a road on which the vehicle is present,
    wherein based at least partly on the road plane equation and a ground point that is a point at which the vehicle and a road plane come into contact with each other, the vehicle type identification device determines three-dimensional coordinates of the vehicle.

11. The vehicle type identification device according to claim 10,
    wherein, in a state where directions of the plurality of models are adjusted to a direction of the vehicle, the model fitting section checks each of vehicle regions, which are obtained from images of the plurality of models taken in the same imaging direction as the captured image, against the vehicle region extracted by the extraction section.

12. The vehicle type identification device according to claim 11,
    wherein the model fitting section adjusts the directions of the plurality of models to the direction of the vehicle by rotating the plurality of models in accordance with a travelling direction vector of the vehicle.

* * * * *